(12) United States Patent
Kobayashi

(10) Patent No.: US 8,753,657 B2
(45) Date of Patent: Jun. 17, 2014

(54) ANTIBACTERIAL RESIN COMPOSITION DERIVED FROM A MASTERBATCH, ANTIBACTERIAL FIBER, ANTIBACTERIAL FILM AND METHOD FOR MANUFACTURING THE ANTIBACTERIAL RESIN COMPOSITION DERIVED FROM A MASTER BATCH

(75) Inventor: Yoshinao Kobayashi, Tokyo (JP)

(73) Assignee: Koa Glass Co., Ltd., Tokyo (JP)

( * ) Notice: Subject to any disclaimer, the term of this patent is extended or adjusted under 35 U.S.C. 154(b) by 0 days.

(21) Appl. No.: 13/581,615

(22) PCT Filed: Oct. 20, 2011

(86) PCT No.: PCT/JP2011/074115
§ 371 (c)(1),
(2), (4) Date: Aug. 29, 2012

(87) PCT Pub. No.: WO2012/098742
PCT Pub. Date: Jul. 26, 2012

(65) Prior Publication Data
US 2012/0321689 A1  Dec. 20, 2012

(30) Foreign Application Priority Data
Jan. 17, 2011 (JP) .................... 2011-6546

(51) Int. Cl.
  *A01N 25/08* (2006.01)
  *A01N 59/16* (2006.01)
  *A61K 33/38* (2006.01)
  *A61K 47/30* (2006.01)
(52) U.S. Cl.
  USPC .................. 424/409; 424/618; 514/772.3

(58) Field of Classification Search
  USPC ................. 424/409, 618; 514/772.3
  See application file for complete search history.

(56) References Cited

U.S. PATENT DOCUMENTS

| | | | |
|---|---|---|---|
| 4,500,665 A * | 2/1985 | Brecker et al. | ............... 524/227 |
| 6,294,183 B1 | 9/2001 | Ito et al. | |
| 2004/0202703 A1* | 10/2004 | Meyer-Ingold et al. | ...... 424/445 |

FOREIGN PATENT DOCUMENTS

| | | | | |
|---|---|---|---|---|
| JP | 4-53868 | 2/1992 | | |
| JP | 05-005058 | * 1/1993 | ............... | C08J 5/18 |
| JP | 9-328605 | 12/1997 | | |
| JP | 11-60804 | 3/1999 | | |
| JP | 2004-359755 | 12/2004 | | |
| JP | 2009-285445 | 12/2009 | | |

OTHER PUBLICATIONS

Extended European Search Report dated May 31, 2013, including a Supplementary European Search Report, for EP Application No. 11856198.4-1302/2530120 (PCT/JP2011/074115).

* cited by examiner

*Primary Examiner* — Aradhana Sasan
(74) *Attorney, Agent, or Firm* — Antonelli, Terry, Stout & Kraus, LLP.

(57) ABSTRACT

The present invention relates to an antibacterial resin composition derived from a master batch, an antibacterial fiber, an antibacterial film, and a producing method of an antibacterial resin composition therefrom, comprising a polyethylene terephthalate resin as the component (A), and a polybutylene terephthalate resin as the component (B), an antibacterial glass which elutes silver ions as a component (C), which is characterized by having a composition formulated below
 (A) a polyethylene terephthalate resin: 100 pbw
 (B) a polybutylene terephthalate resin: 0.5 to 25 pbw
 (C) an antibacterial glass: 0.1 to 10 pbw.

10 Claims, 6 Drawing Sheets

ANTIBACTERIAL RESIN COMPOSITION DERIVED FROM A MASTERBATCH, ANTIBACTERIAL FIBER, ANTIBACTERIAL FILM AND METHOD FOR MANUFACTURING THE ANTIBACTERIAL RESIN COMPOSITION DERIVED FROM A MASTER BATCH

FIELD OF THE INVENTION

The present invention relates to an antibacterial (antimicrobial) resin composition derived from a master batch, an antibacterial fiber, an antibacterial film and a method for manufacturing the antibacterial resin composition derived from a master batch Especially, the present invention relates to an antibacterial resin composition having a good hydrolysis ability which is made from a master batch and which main component is a polyester resin easily available for processing to an antibacterial fiber and an antibacterial film.

The present invention also relates to an antibacterial fiber thereof, an antibacterial film thereof, and a method for manufacturing the antibacterial resin composition which is made from a master batch.

BACKGROUND ART

Recently, a specific resin composition having antibacterial property, or an antibacterial resin composition is widely used for building materials, electrical appliances, sundry goods, wrapping goods, food producing equipments, pharmacy producing equipments, medical equipments and so on.

Also, as an antibacterial agent included the antibacterial resin composition, an inorganic antibacterial agent such as an antibacterial glass which can elute Ag ions etc. by contacting water, since the inorganic antibacterial agent is safety and continue the antibacterial effect for a long time in comparison with an organic antibacterial agent.

Further, a polyethylene terephthalate resin (PET) has been suitably used as the resin component of the antibacterial resin composition, since it has relatively low crystallinity and is easy to be processed into fibers and films.

In addition, a polybutylene terephthalate resin (PBT) has been also preferably used, since it has a low melting point and is easy to be molded to a plate and the like and even if it has the relatively high crystallinity (for example, the patent document 1 and the patent document 2).

More specifically, in the patent document 1, the antibacterial resin composition has been disclosed in that the antibacterial glass was added into the specific resin having the total light transmittance of 80% or more, which antibacterial glass contains ZnO of 25 to 60 wt. %, and contains no more silver in the antibacterial glass formulation.

And, there is provided the antibacterial resin composition, wherein the total light transmittance is 80% or more, the haze value is 20% or less, and a polyethylene terephthalate resin is used as a resin component.

Further, in the patent document 2, the antibacterial resin composition, which includes (a) the thermoplastic resin having an ester bond in the main chain, (b) the thermoplastic resin having the solubility parameter which is less than that of the component (a), and (c) inorganic antibacterial agent, has been disclosed.

And the antibacterial resin composition using a polyethylene terephthalate resin, a polybutylene terephthalate resin, and mixtures of these resins as component (a) has been disclosed.

PRIOR ART DOCUMENTS

Patent Document

[Patent Document 1] JP2004-359755A (claims etc.)
[Patent Document 2] JPH09-328605A (claims etc.)

SUMMARY OF THE INVENTION

Problems to be Solved by the Invention

However, the resin component in the antibacterial resin composition of the patent document 1 was easily hydrolyzed, since it was heated and melted in the molding process of the molding article and its manufacturing process.

Also there was a problem that it was difficult to obtain a stable antibacterial resin composition to thoroughly disperse the antibacterial glass into the resin.

Namely, an antibacterial glass itself is configured to elute the antibacterial component such as silver ions dissolved by contact with the moisture and is basically a material easy to absorb moisture.

In particular, an antibacterial glass used in an antibacterial fiber and an antibacterial film has a very small particle size and there is a tendency that its surface area becomes big.

Therefore, the moisture content in the antibacterial glass becomes easily predetermined level or more. Thus, there is a problem that a polyethylene terephthalate resin of the antibacterial resin composition of the patent document 1 is easily hydrolyzed when heated and melted.

Thus, there is a problem that a polyethylene terephthalate resin of the antibacterial resin composition of the patent document 1 is easily hydrolyzed when heated and melted.

In addition, the antibacterial resin composition is for example molded to such as a plate by an injection molding equipment etc. and is often formed into a fiber by a melt spinning method and a film by an extrusion method. In those cases, the antibacterial resin composition is molded while being heated to high temperatures such as about 270° C.

Therefore, in the antibacterial resin composition of the patent document 1, the hydrolysis of a polyethylene terephthalate resin is further promoted by the moisture which is greater than the predetermined level of the moisture contained in the above-described antibacterial glass.

In addition, an antibacterial resin composition is generally made from a master batch, in order to improve a dispersion property and a dispersion efficiency of the antibacterial glass.

Namely, the resin composition including the antibacterial glass of the predetermined concentration in the heated and melted resin condition, which is higher than the final concentration level of an antibacterial resin composition, so-called, the master batch is produced.

Then, in general, the obtained master batch resin composition is added to a resin component and mixed and dispersed to obtain the antibacterial resin composition having a final concentration of the antibacterial glass.

Therefore, in the case of the patent document 1, the master batch resin composition including a high concentration of antibacterial glass to the polyethylene terephthalate resin as a resin component, include the moisture content with increasing of the amount of the antibacterial glass.

As a result, in the antibacterial resin composition of the patent document 1, the hydrolysis of the polyethylene terephthalate resin based on the above-mentioned moisture which is higher than the predetermined level contained in the antibacterial glass, is more and more promoted, when heated and melted.

In addition to that, in the master batch containing a high concentration of the antibacterial glass, the hydrolysis of the polyethylene terephthalate resin is further promoted by an acid component such as phosphoric acid contained in the antibacterial glass.

Moreover, when the hydrolysis of the polyethylene terephthalate resin was occurred, there was a problem that the dispersibility of the antibacterial glass into the polyethylene terephthalate resin became excessively worse. So, it would be difficult to obtain the antibacterial resin composition having a good transparency and antibacterial property.

On the other hand, as mentioned above, in the patent document 2, an antibacterial resin composition comprising a polyethylene terephthalate resin, a polybutylene terephthalate resin, and mixtures of these resins as the resin component is disclosed.

However, when a polyethylene terephthalate resin was used alone as a resin component and it was heated and melted, there was a problem that the polyethylene terephthalate resin was easily hydrolyzed by the moisture which is greater than a predetermined level that is contained in the antibacterial glass as in the case of the patent document 1.

In addition, in the patent document 2, when a polybutylene terephthalate resin was used alone as a resin component, the resin hydrolysis was protected in some extent, but there was a problem that it became difficult to be processed into fibers and antibacterial film.

In other words, since the polybutylene terephthalate resin had a higher crystallinity compared with the polyethylene terephthalate resin, it was difficult to be processed into the antibacterial fiber and antibacterial film wherein a good flexibility is required.

In addition, a mixture of the polybutylene terephthalate resin and the polyethylene terephthalate resin as an example of the resin component has been described in the patent document 2.

However, it was not described the concrete mixing ratio of the polybutylene terephthalate resin for the polyethylene terephthalate resin in any way.

In examples of the patent document 2, the only use of the polybutylene terephthalate resin as a resin component was described. That is, for the antibacterial resin composition using a mixture resin has not been specifically disclosed.

Therefore, in the patent document 2, the antibacterial resin composition having a good hydrolysis resistance could not been considered, even if the polyethylene terephthalate resin that can be processed to an antibacterial fiber and an antibacterial film as a main component was used.

Thus, the present inventors have made researches earnestly and, as a result, have found that by formulating the master batch comprising the polybutylene terephthalate resin and the antibacterial glass in the predetermined ratio, then by forming the antibacterial fiber and film from the master batch with the polyethylene terephthalate resin as the main component, the hydrolysis of the polyethylene terephthalate resin as the main component could be efficiently prevented.

That is, the objective of the present invention is to provide an antibacterial resin composition derived from a master batch, wherein the polyethylene terephthalate resin which could be processed to an antibacterial fiber and an antibacterial film is a main component, and the antibacterial resin composition has a good hydrolysis resistance as well as a good dispersibility of the antibacterial glass.

Another object of the present invention is to provide an antibacterial film and an antibacterial fiber which are processed from the antibacterial resin composition.

Furthermore, the other object of the present invention is to provide a method for manufacturing the antibacterial resin composition derived from the master batch.

Means to Solve the Problem

According to the present invention, there is provided an antibacterial resin composition derived from a master batch comprising a polyethylene terephthalate resin as the component (A), and a polybutylene terephthalate resin as the component (B), and an antibacterial glass which elutes silver ions as a component (C), which is characterized by having a composition formulated below, to solve the above-mentioned problems.

(A) a polyethylene terephthalate resin: 100 pbw
(B) a polybutylene terephthalate resin: 0.5 to 25 pbw
(C) an antibacterial glass: 0.1 to 10 pbw Namely, in comparison with a polybutylene terephthalate resin alone, the present antibacterial resin composition contains a polyethylene terephthalate resin as a main component which crystalline content is low, and such composition could be processed to an antibacterial film, an antibacterial fiber and the like which are required for a good flexibility with a stable productivity.

In addition, in comparison with the polyethylene terephthalate resin alone, the present antibacterial resin composition contains a polybutylene terephthalate resin within the predetermined content range, and the hydrolysis of the polyethylene terephthalate resin due to the moisture contained in the antibacterial glass could be effectively prevented, when the heating and melting process were carried out for manufacturing and molding of the antibacterial resin composition.

Further, the present antibacterial resin composition can show an excellent antibacterial effect as well as a good hydrolysis resistance, by including the antibacterial glass within the predetermined content and dispersing it uniformly into the specific resins.

Therefore, according to the present invention, even if a polyethylene terephthalate resin which can be processed to an antibacterial fiber and an antibacterial film is used as a main component, it is possible to obtain an antibacterial resin composition having a good hydrolysis resistance and an excellent dispersibility of the antibacterial glass into the specific resins.

In addition, upon constituting the antibacterial resin composition derived from the master batch of the present invention, it is preferred that the number of average molecular weight of the polyethylene terephthalate resin as the component (A) is set to be the value within the range of 10,000 to 80,000 and the number of average molecular weight of the polybutylene terephthalate resin as a component that (B) is set to be the value within the range of 10,000 to 50,000.

By configuring like this, it would be possible to improve the compatibility of the polybutylene terephthalate resin and the polyethylene terephthalate resin, to effectively prevent the hydrolysis of the polyethylene terephthalate resin, and to disperse the antibacterial glass into the resins more uniformly.

In addition, upon constituting the antibacterial resin composition derived from the master batch of the present invention, it is preferred that a moisture content of the antibacterial glass is set to be the value within the range of $1 \times 10^{-4}$ to 5 wt. % with respect to the 100 wt. % of solid component of the antibacterial glass as a component (C), even if the antibacterial glass as a component (C) contains the moisture.

By configuring like this, it would be possible to effectively prevent the hydrolysis of the polyethylene terephthalate resin as the main component and to disperse the antibacterial glass into the resins more uniformly, even if the drying step for the antibacterial glass is omitted in the manufacture of the antibacterial resin composition derived from the master batch.

In addition, upon constituting the antibacterial resin composition derived from the master batch of the present invention, it is preferred that the volume average particle size of the antibacterial glass as a component (C) is set to be the value within the range of 0.1 to 10 μm.

By configuring like this, it would be possible to disperse the antibacterial glass into the resins more uniformly and to effectively process the antibacterial resin composition into an antibacterial fiber and an antibacterial film.

In addition, upon constituting the antibacterial resin composition derived from the master batch of the present invention, it is preferred that the antibacterial glass as a component (C), is both a phosphate glass and a borosilicate or either.

By configuring like this, it would be possible to control an elution volume of silver ions etc. in the favorable range as well as preventing the color change of the antibacterial resin composition.

In addition, upon constituting the antibacterial resin composition derived from the master batch of the present invention, it is preferred that an alkylene fatty acid amide compound of the component (D) as a dispersant aid agent is included and its content is set be a value in the range of 1 to 20 pbw to the 100 pbw of the antibacterial glass.

By configuring like this, it would be possible to uniformly disperse the antibacterial glass into the specific resins.

Also, another aspect of the present invention is an antibacterial fiber which is processed from the above-mentioned antibacterial resin composition derived from the master batch.

That is, the present antibacterial fiber of the present invention which is processed of the present antibacterial prescribed resin composition derived from the master batch and it is possible to obtain a high-quality antibacterial fiber wherein the antibacterial glass is dispersed uniformly without causing the hydrolysis of the polyethylene terephthalate resin as the main component.

Also, another aspect of the present invention is an antibacterial film which is processed from the above-mentioned antibacterial resin composition derived from the master batch.

That is, the present antibacterial film of the present invention which is processed of the present antibacterial prescribed resin composition derived from the master batch and it is possible to obtain a high-quality antibacterial film wherein the antibacterial glass is dispersed uniformly without causing the hydrolysis of the polyethylene terephthalate resin as the main component.

Also, another aspect of the present invention is a method for manufacturing the antibacterial resin composition derived from a master batch comprising a polyethylene terephthalate resin as the component (A), and a polybutylene terephthalate resin as the component (B), and an antibacterial glass which elutes silver ions as a component (C), which is characterized by including the following first step (a) and the second step (b).

(a) 5 to 40 pbw of the antibacterial glass as a component (C) is added to 100 pbw of the polybutylene terephthalate resin as a component (B), mixed and dispersed to obtain a master batch as the first step.

(b) 0.5 to 25 pbw of the master batch is added to 100 pbw of the polyethylene terephthalate resin as a component (A), mixed and dispersed to obtain the antibacterial resin composition derived from a master batch comprising below as the second step.

(A) a polyethylene terephthalate resin: 100 pbw
(B) a polybutylene terephthalate resin: 0.5 to 25 pbw
(C) an antibacterial glass: 0.1 to 10 pbw Thus, it is possible to produce a master batch which includes a polybutylene terephthalate resin which hydrolysis resistance is better than a polyethylene terephthalate resin as the resin component by including the first step (a).

Also, it is possible to effectively prevent the hydrolysis of a polyethylene terephthalate resin which occurs when the master batch is prepared from a polyethylene terephthalate resin as a resin component, by including the second step (b).

In addition, by including the second step (b), it is possible to effectively prevent the hydrolysis of a polyethylene terephthalate resin as the main component and to obtain the antibacterial resin composition wherein the antibacterial glass is dispersed uniformly in a final concentration.

Therefore, according to the present invention, while the main component is a polyethylene terephthalate resin that can be processed to the antibacterial fiber and the antibacterial film, it is possible to produce the antibacterial resin composition wherein a hydrolysis resistance is good and a dispersibility of antibacterial glass is also good with stable conditions.

THE EMBODIMENT TO CARRY OUT THE INVENTION

First Embodiment

Figure 1:
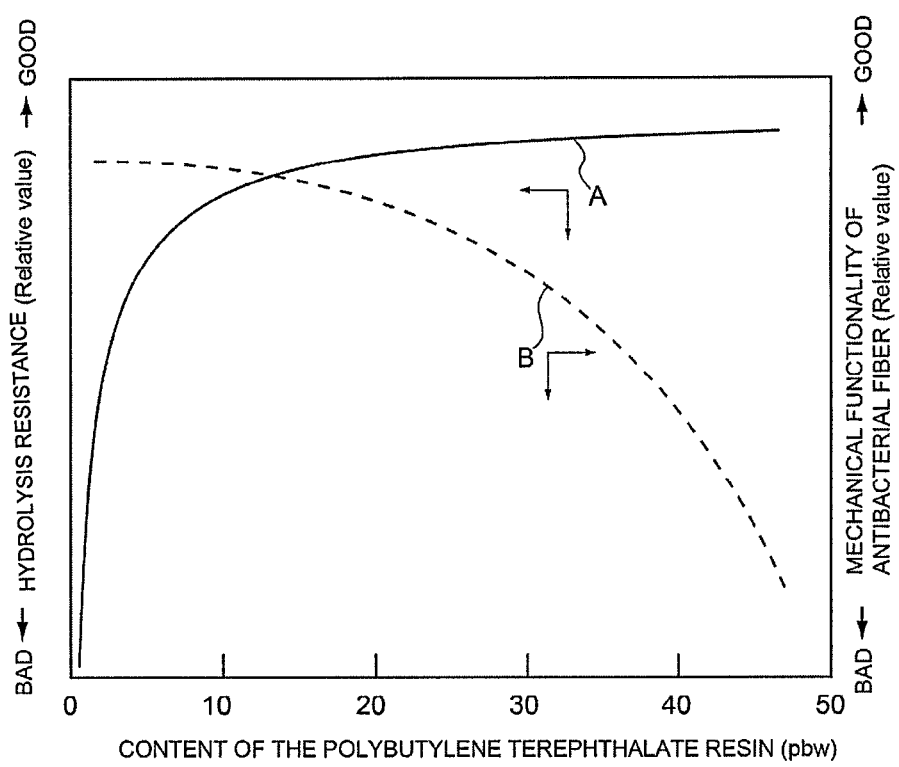
FIG. 1 illustrates the relationship between the amount of the polybutylene terephthalate resin as the component (B), and the hydrolysis resistance of the antibacterial resin composition and the mechanical functionality of the antibacterial fiber.

A first embodiment is an antibacterial resin composition derived from a master batch comprising a polyethylene terephthalate resin as the component (A), a polybutylene terephthalate resin as the component (B), and an antibacterial glass which elutes silver ions as a component (C), which is characterized by having a composition formulated below.

(A) a polyethylene terephthalate resin: 100 pbw
(B) a polybutylene terephthalate resin: 0.5 to 25 pbw
(C) an antibacterial glass: 0.1 to 10 pbw Hereinafter, the antibacterial resin composition derived from the master batch of the first embodiment will be concretely described by each configuration element.

1. (A) Component: Polyethylene Terephthalate Resin

The antibacterial resin composition derived from the master batch according to the present invention is characterized in that it comprises a polyethylene terephthalate resin of the component (A) as a main component.

The reason is that, the polyethylene terephthalate resin has low crystalline in comparison with the polybutylene terephthalate resin and the like and it is stably processed to an antibacterial fiber, an antibacterial film and the like which are required for an excellent flexibility.

More specifically, the polyethylene terephthalate resin has the characteristic point that a crystallization rate is low in comparison with the polybutylene terephthalate resin, and that crystallization does not proceed at a low temperature.

Therefore, by using the polyethylene terephthalate resin as the main component, the crystallization of the antibacterial resin composition is effectively prevented in the process of its manufacturing and molding process and an antibacterial fiber, an antibacterial film and the like are stably processed.

Also, the polyethylene terephthalate resin has a high transparency and an excellent heat resistance, and is cheaper as well as having a good recycling property.

More specifically, as for the plastic bottle case, for example, the larger amounts of plastic bottles such as drinking case consisting of the polyethylene terephthalate resin are now in circulation in the market.

So, for example, in comparison with the other resin material such as a polybutylene terephthalate resin, a polyethylene terephthalate resin is very cheap.

In addition, because there is the current fact that the polyethylene terephthalate resin is effectively recycled and its re-use is easier than the other resin material, it is apparent that the polyethylene terephthalate resin becomes the cheaper material.

On the other hand, there was a problem that the hydrolysis easily occurred in the polyethylene terephthalate resin when heated and melted in the molding process and the manufacturing process. So it was difficult to obtain the antibacterial resin composition wherein an antibacterial glass was dispersed uniformly in the polyethylene terephthalate resin.

Regarding this problem, the antibacterial resin composition derived from the master batch of the present invention could prevent the hydrolysis effectively, since such composition includes the polybutylene terephthalate resin as the component (B) in the predetermined range as mentioned below.

Namely, the details of such hydrolysis resistance are later described in terms of the polybutylene terephthalate resin as the component (B).

(1) Kind

As for the kind of the polyethylene terephthalate resin of the present invention, it basically means a polymer which is obtained by the polycondensation reaction between ethylene glycol or ester-forming derivative thereof, as a glycol component, and terephthalic acid or ester-forming derivative thereof, as the acid component.

Here, other acid components could be included, if such content is in the range of 20 mol % or less to 100 mol % of the total amount of the acid components.

Similarly, other glycol components could be included, if such content is in the range of 20 mol % or less to 100 mol % of the total amount of the glycol components.

In addition, as for the other acid components, isophthalic acid, adipic acid, oxalic acid and the like could be available.

Further, as for the other glycol components, propylene glycol, 1,4-butanediol, neopentyl glycol, 1,5-pentanediol, 1,6-hexanediol, decamethylene glycol, cyclohexane dimethanol, cyclohexane diol, polyethylene glycol having average molecular weight of 400 to 6000, poly-1,3-propylene glycol, and polytetramethylene glycol could be available.

(2) The Number Average Molecular Weight

Also, it is preferred that a number average molecular weight of the polyethylene terephthalate resin is set to be a value within the range of 10,000 to 80,000.

The reason is that, by setting the value in the range of a number average molecular weight of the polyethylene terephthalate resin, it would be possible to improve the compatibility of the resins between the polybutylene terephthalate resin and the polyethylene terephthalate resin, and to effectively prevent the hydrolysis of the polyethylene terephthalate resin as well as improving the dispersibility of the antibacterial glass.

That is, if the number average molecular weight of the polyethylene terephthalate resin is below of 10,000, mechanical properties such as tensile strength and tear strength in the antibacterial resin composition excessively degrade. Further, the viscosity of the melt state of the antibacterial resin composition when heated becomes too low and the processability becomes worse.

On the other hand, if the number average molecular weight of the polyethylene terephthalate resin is over 80,000, the viscosity of the antibacterial resin composition becomes too high and it becomes difficult to disperse the antibacterial glass into the resin uniformly.

Thus, the number average molecular weight of the polyethylene terephthalate resin is favorably set to be a value within the range of 20,000 to 60,000, more preferably within the range of 30,000 to 50,000.

In addition, the number average molecular weight of the polyethylene terephthalate resin, could be calculated using the formula based on the relationship between intrinsic viscosity and the molecular weight.

At this time, as a solvent for polyethylene terephthalate resin, it is possible to use solvents such as tetrachloroethane mixture of ortho-chlorophenol, and meta-cresol.

In addition, the relationship between the intrinsic viscosity (IV) and the molecular weight can be measured by the I. M. Ward formula (1) as follows.

$$[\eta]=3.07\times10^{-4}\,Mn^{0.77} \quad (1)$$

($[\eta]$: ortho-chlorophenol solvent, measured temperature at 25° C.)

Others, the number-average molecular weight of the polyethylene terephthalate resin, could be measured by a GPC (gel permeation chromatography) using the standard polystyrene particles.

(3) Melting Point

Also, it is preferred that a melting point of the polyethylene terephthalate resin is set to be a value within the range of 150 to 350° C.

The reason is that, if the melting point of the polyethylene terephthalate resin is below of 150° C., mechanical properties such as tensile strength and tear strength of the antibacterial resin composition excessively degrade and the viscosity of the melting state of the antibacterial resin composition when heated becomes too low and the processability becomes worse.

On the other hand, if the melting point of the polyethylene terephthalate resin is over 350° C., the molding-ability of the antibacterial resin composition becomes excessively worse and the compatibility with the below-mentioned the polyethylene terephthalate resin becomes worse.

Thus, the melting point of the polyethylene terephthalate resin is favorably set to be a value within the range of 200 to 300° C., more preferably within the range of 230 to 270° C.

Namely, the melting point of the polyethylene terephthalate resin could be measured in accordance with ISO 3146.

(4) Content

Also, it is preferred that a content of the polyethylene terephthalate resin is set to be a value within the range of 80 to 99.4 wt. % with respect to 100 wt. % of the total weight of the antibacterial resin composition.

The reason is that, by setting the predetermined value in the range of the content of the polyethylene terephthalate resin, it would be possible to effectively prevent the hydrolysis of the polyethylene terephthalate resin as well as improving the processability to an antibacterial fiber and an antibacterial film.

Thus, if the content of the polyethylene terephthalate resin is below of 80 wt. %, the content of the polybutylene terephthalate resin having the high crystallization is comparatively increased and it would be difficult to process the antibacterial fiber and the antibacterial film. Further, it would be difficult to effectively prevent the hydrolysis of the polyethylene terephthalate resin since the content of the antibacterial glass is correspondingly increased.

On the other hand, if the content of the polyethylene terephthalate resin is over 99.4 wt. %, the content of the polybutylene terephthalate resin having the good hydrolysis resistance, is comparatively decreased and it would be difficult to effectively prevent the hydrolysis of the polyethylene terephthalate resin. Further, it would be difficult to effectively show the antibacterial effect since the content of the antibacterial glass is correspondingly decreased.

Accordingly, the content of the polyethylene terephthalate resin is favorably set to be the value within the range of 85 to 99 wt. % with respect to 100 wt. % of the total weight of the antibacterial resin composition, more preferably within the range of 90 to 98 wt. %.

2. (B) Component: Polybutylene Terephthalate Resin

An antibacterial resin composition derived from the master batch of the present invention is characterized in that it comprises the polybutylene terephthalate resin as the component (B) which is different from the polyethylene terephthalate resin of the component (A) as the main component.

The reason is that, the polybutylene terephthalate resin has better hydrolysis resistance in comparison with the polyethylene terephthalate resin and the hydrolysis due to the moisture included in the antibacterial glass is effectively prevented in the process of its manufacturing and molding process of the antibacterial resin composition.

More specifically, the polybutylene terephthalate resin has the characteristic point that hydrophobic ability is higher and hydrophilic ability is lower in comparison with the polyethylene terephthalate resin, and so the hydrolysis is presumed to effectively be prevented.

Also, the polybutylene terephthalate resin has lower number of the ester unit in comparison with the polyethylene terephthalate resin and so the hydrolysis is presumed to effectively be prevented.

Therefore, by including the polybutylene terephthalate resin, it would be possible to prevent the hydrolysis of the polyethylene terephthalate resin as the main component and to obtain the antibacterial resin composition wherein the antibacterial is uniformly dispersed and its cost becomes cheap.

(1) Kind

As for the kind of the polybutylene terephthalate resin of the present invention, it basically means a polymer which is obtained by the polycondensation reaction between terephthalic acid or ester-forming derivative thereof, as the acid component and 1,4-butanediol or its ester-forming derivative or ester-forming derivative thereof, as a glycol component.

However, other acid components could be included if such content is in the range of 20 mol % or less to 100 mol % of the total amount of the acid components.

Similarly, other glycol components could be included, if such content is in the range of 20 mol % or less to 100 mol % of the total amount of the glycol components.

In addition, as for the other acid component, isophthalic acid, naphthalene dicarboxylic acid, adipic acid, sebacic acid, dodecanedioic acid, oxalic acid and the like can be mentioned.

Further, as for the other glycol components, ethylene glycol, propylene glycol, neopentyl glycol, 1,5-hexane diol, decamethylene glycol, cyclohexane dimethanol, cyclohexane diol, molecular weight—pentane diol, 1,6 polyethylene glycol having the average molecular weight of 400 to 6000, poly-1,3-propylene glycol, and polytetramethylene glycol-ethylene glycol, could be mentioned.

(2) The Number Average Molecular Weight

Also, it is preferred that the number average molecular weight of the polybutylene terephthalate resin is the value in the range of 10,000 to 50,000.

The reason is that, by setting the value in the range of a number average molecular weight of the polybutylene terephthalate resin, it would be possible to improve the compatibility of the resins between the polybutylene terephthalate resin and the polyethylene terephthalate resin, and to effectively prevent the hydrolysis of the polyethylene terephthalate resin as well as improving the dispersibility of the antibacterial glass.

That is, if the number average molecular weight of the polybutylene terephthalate resin is below of 10,000, mechanical properties such as tensile strength and tear strength in the antibacterial resin composition excessively degrade. Further, the viscosity of the melt state of the antibacterial resin composition when heated becomes too low and the processability becomes worse.

On the other hand, if the number average molecular weight of the polybutylene terephthalate resin is over 50,000, the viscosity of the antibacterial resin composition becomes too high and it becomes difficult to disperse the antibacterial glass into the resin uniformly.

Thus, the number average molecular weight of the polybutylene terephthalate resin is favorably set to be the value within the range of 20,000 to 45,000, more preferably within the range of 25,000 to 40,000.

Incidentally, the number average molecular weight of the polybutylene terephthalate resin can be calculated using the formula showing the relationship between intrinsic viscosity and molecular weight.

At this time, as a solvent for the resin, orthochlorophenol, a mixture of meta-cresol and tetrachloroethane, or hexafluoro isopropanol and the like can be used. In addition, as the relationship formula between intrinsic viscosity and molecular weight, for example, the expression of Bormann represented by the following formula (2) can be used.

$$[\eta]=1.29\times10^{-4}\times Mn^{0.871} \qquad (2)$$

([η]: solvent of phenol/tetrachloroethane=6/4, measured at 30° C.)

Others, the number average molecular weight of polybutylene terephthalate resin, can also be measured by a GPC (gel permeation chromatography) using the polystyrene standard.

(3) Melting Point

Also, it is preferred that a melting point of the polybutylene terephthalate resin is set to be a value within the range of 120 to 320° C.

The reason is that, if the melting point of the polybutylene terephthalate resin is below of 120° C., mechanical properties such as tensile strength and tear strength in the antibacterial resin composition excessively degrade and the viscosity of the melt state of the antibacterial resin composition when heated becomes too low and the processability becomes worse.

On the other hand, if the melting point of the polybutylene terephthalate resin is over 320° C., the molding-ability of the antibacterial resin composition becomes too worse and the compatibility with the below-mentioned the polybutylene terephthalate resin becomes worse.

Thus, the melting point of the polybutylene terephthalate resin is favorably set to be a value within the range of 170 to 270° C., more preferably within the range of 200 to 240° C.

Namely, the melting point of the polybutylene terephthalate resin could be measured in accordance with ISO 3146.

(4) Content

Also, it is preferred that a content of the polybutylene terephthalate resin is set to be a value within the range of 0.5 to 25 pbw to 100 pbw of the polyethylene terephthalate resin.

The reason is that, by setting the content value within the range, it would be possible to effectively prevent the hydrolysis of the polyethylene terephthalate resin as well as improving the processability to an antibacterial fiber and an antibacterial film.

Thus, if the content of the polybutylene terephthalate resin is below of 0.5 pbw, it would be difficult to effectively prevent the hydrolysis of the polyethylene terephthalate resin since the absolute content of the polybutylene terephthalate resin becomes low.

On the other hand, if the content of the polybutylene terephthalate resin is over 25 pbw, the content of the polyethylene terephthalate resin having the low crystal-ability becomes low and it would be difficult to process the antibacterial resin composition to an antibacterial fiber and an antibacterial film.

Accordingly, the content of the polybutylene terephthalate resin is favorably set to be a value within the range of 2 to 15 pbw, more preferably within the range of 3 to 10 pbw.

Then, by referring to FIG. 1, the relationship among the content of the polybutylene terephthalate resin as the component (B), the hydrolysis resistance of the antibacterial resin composition derived from the master batch, and the mechanical function of the antibacterial fiber will be explained.

That is, in FIG. 1, the content (pbw/pbw) of the polybutylene terephthalate resin as the component (B) to 100 pbw of the polyethylene terephthalate resin is taken on the horizontal axis.

Also, the hydrolysis resistance (relative value) of the antibacterial resin composition is taken on the left vertical axis and its characteristic curve A is shown.

Further, the mechanical function (relative value) of the antibacterial fiber consisting of the antibacterial resin composition derived from the master batch is taken on the right vertical axis and its characteristic curve B is shown.

Still further, the hydrolysis resistance of the antibacterial resin composition derived from the master batch can be evaluated based on, in particular, IV value (Intrinsic Viscosity value) such as the value having a correlation with the hydrolysis of the resin composition.

In addition, it is possible to evaluate the mechanical functionality of the antibacterial fiber based on tensile strength, tear strength and the like in the antibacterial fiber as well as the molding-ability of the antibacterial fiber.

The details about the fiber and the antibacterial resin composition derived from the master batch will be described in the examples.

Firstly, as it is understood from the characteristic curve A, in the case that the polybutylene terephthalate resin is 0 pbw, the hydrolysis resistance of the antibacterial resin composition derived from the master batch is excessively decreased.

However, in the case that the polybutylene terephthalate resin is included in a small content, such as 0.5 pbw with respect to 100 pbw of the polyethylene terephthalate resin, the hydrolysis resistance is greatly improved.

Also, when the content of the polybutylene terephthalate resin is increased as it is, it can be seen that the excellent hydrolysis resistance would be maintained.

On the other hand, as it is understood from the characteristic curve B, with the increase of the polybutylene terephthalate resin content, there is the tendency that the mechanical function of the antibacterial fiber is decreased correspondingly.

More specifically, if the content of the polybutylene terephthalate resin is 25 pbw or less with respect to 100 pbw of the polyethylene terephthalate resin, mechanical function is maintained at the level required for practical use. However, if such content of the polybutylene terephthalate resin is over 25 pbw, the mechanical function is excessively decreased.

This is presumed that the crystalline of the polybutylene terephthalate resin is higher with compared to the polyethylene terephthalate resin.

In event, based on the characteristic curves A and B, it is understood that the hydrolysis resistance of the antibacterial resin composition derived from the master batch is improved and the antibacterial fibers etc. with excellent mechanical functions could be obtained by controlling the polybutylene terephthalate resin in the range of 0.5 to 25 pbw to 100 pbw of the polyethylene terephthalate resin.

3. (C) Component: Antibacterial Glass

The antibacterial resin composition derived from the master batch of the present invention is characterized by comprising an antibacterial glass of the component (C) which elutes silver ions as the antibacterial component.

The reason is that, the antibacterial glass is like this has high safety, a long lasting antibacterial effect, and a high heat resistance which is suitable for an antibacterial agent to be contained in the antibacterial resin composition.

(1) Formulation

In addition, it is preferable to use both a phosphate glass and a borosilicate or either.

The reason is that, if the phosphate glass or a borosilicate glass is used, it would be possible to prevent the color change of the antibacterial resin composition and to control the elution volume of the silver ions of the antibacterial resin composition in the favorable range.

(1)—1 Glass Composition 1

As the glass composition (glass composition 1) of the antibacterial glass, it is preferable that the antibacterial glass includes $Ag_2O$, $ZnO$, $CaO$, $B_2O_3$ and $P_2O_5$. When the total amount is set to 100 wt. %, it is preferable to set a content of $Ag_2O$ to a value within a range of 0.2 to 5 wt. %, to set a content of ZnO to a value within a range of 2 to 60 wt %, to set a content of CaO to a value within a range of 0.1 to 15 wt. %, to set a content of $B_2O_3$ to a value within a range of 0.1 to 15 wt. %, and to set a content of $P_2O_5$ to a value within a range of 30 to 80 wt. % and, at the same time, to set a weight ratio of ZnO/CaO to a value within a range of 1.1 to 15.

Here, $Ag_2O$ is an indispensable constituent component in the antibacterial glass of the glass composition 1. The antibacterial glass which exhibits an excellent antibacterial property for a long period can be produced by melting a glass component so as to release an Ag ion.

Also, it is preferable to set a content of the $Ag_2O$ to a value within a range of 0.2 to 5 wt. %. The reason is that, if the content of the $Ag_2O$ is below of 0.2 wt. %, the antibacterial property of the antibacterial glass becomes insufficient and a large amount of antibacterial glass becomes necessary to obtain a given antibacterial effect. On the other hand, if the content of the $Ag_2O$ is over 5 wt. %, the antibacterial glass is more liable to be discolored or it pushes up the cost and hence, it is disadvantageous in economic aspect.

Also, $P_2O_5$ is an indispensable constituent component in the antibacterial glass of glass composition 1. Although $P_2O_5$ basically performs the function of the network-forming oxide, $P_2O_5$ also relates to the transparency improving function of the antibacterial glass and the uniform releasing property of an Ag ion in the present invention.

Here, it is preferable to set the content of $P_2O_5$ to a value within a range of 30 to 80 wt. %. The reason is that, if the content of $P_2O_5$ is below of 30 wt. %, there is a possibility that the transparency of the antibacterial glass is lowered or the uniform releasing property of the Ag ion and mechanical strength are reduced. On the other hand, if the content of $P_2O_5$ is over 80 wt. %, there is a possibility that the antibacterial glass is easily subjected to yellowing or lacks in hardness so that mechanical strength is reduced.

Also, ZnO performs a function of a network-modifying oxide in the antibacterial glass, a function of preventing yellowing and a function of enhancing antibacterial property.

Here, it is preferable to set the content of ZnO to be a value within a range of 2 to 60 wt. % with respect to a total amount. The reason is that, if the content of ZnO is below of 2 wt. %, there may be case that the yellowing preventing effect and the antibacterial property enhancing effect cannot be expected.

On the other hand, if the content of ZnO is over 60 wt. %, there may be a case that the transparency of the antibacterial glass is deteriorated and the mechanical strength becomes insufficient.

Further, it is preferable to set the content of ZnO in view of the content of CaO which will be explained later.

To be more specific, it is preferable to set the weight ratio expressed by ZnO/CaO to a value within a range of 1.1 to 1.5.

The reason is that if the weight ratio is a value below of 1.1, there may be a case that it is difficult to efficiently prevent yellowing of the antibacterial glass. On the other hand, if the weight ratio is over 15, there may be a case that the antibacterial glass becomes whitening or yellowing as the color change.

With the use of CaO in the antibacterial glass of the present invention, CaO basically performs the function of the network-modifying oxide and, at the same time, lowers a heating temperature at the time of forming the antibacterial glass. Further, CaO performs the function of preventing yellowing with the aid of ZnO.

Here, it is preferable to set the content of CaO to a value within a range of 0.1 to 15 wt. % with respect to the total amount of the microbial glass. The reason is that if the content of CaO becomes less than 0.1 wt. %, there is a possibility that additional effects (yellowing preventing function and melting temperature lowering effect) cannot be exhibited. On the other hand, if the content of CaO is over 15 wt. %, the transparency of the antibacterial glass is lowered to the contrary.

Also, $B_2O_3$ is an indispensable constituent component in the antibacterial glass of the glass composition 1.

Although $B_2O_3$ basically performs the function of the network-forming oxide, $B_2O_3$ also relates to the transparency improving function of the antibacterial glass and the uniform releasing property of an Ag ion in the present invention.

Here, it is preferable to set the content of $B_2O_3$ to be a value within a range of 0.1 to 15 wt. %. The reason is that if the content of $B_2O_3$ becomes less than 0.1 wt. %, there is a possibility that the transparency of the antibacterial glass is lowered or the uniform releasing property of the Ag ion and mechanical strength are reduced, while if the content of $B_2O_3$ is over 15 wt. %, there is a possibility that the antibacterial glass is easily subjected to yellowing or lacks in hardness so that mechanical strength is reduced.

Also with respect to the optional component of the glass composition 1, it is preferred that $CeO_2$, MgO, $Na_2O$, $Al_2O_3$, $K_2O$, $SiO_2$, BaO and the like are included in the predetermined content which is available within the present objective.

(1)—2 Glass Composition 2

In addition, as an antibacterial phosphoric acid glass formulation, $Ag_2O$, CaO, $B_2O_3$ and $P_2O_5$ in place of ZnO are included, and when the total amount is 100 wt. %, the content of $Ag_2O$ is set to be a value within the range of 0.2 to 5 wt. %, the content of CaO is set to be a value within the range of 15 to 50 wt. %, the content of $B_2O_3$ is set to be a value within the range of 0.1 to 15 wt. %, the content of $P_2O_5$ is set to be a value within the range of 30 to 80 wt. % and the weight ratio of $CaO/Ag_2O$ is set to be a value within the range of 5/15.

With respect to $Ag_2O$, it can have the same content as the first embodiment, accordingly, it is preferable to set such content of $Ag_2O$ to be a value within a range of 0.2 to 5 wt. %.

With the use of CaO in the antibacterial glass of the present invention, CaO basically performs the function of network-modifying oxide and, at the same time, performs the function of lowering heating temperature and the function of preventing yellowing at the time of producing the antibacterial glass.

Here, it is preferable to set a content of CaO to be a value within a range of 15 to 50 wt. % with respect to a total amount. The reason is that if the content of CaO is below of 15 wt. %, since the antibacterial glass substantially does not contain ZnO, there is a possibility that the yellowing preventing function and the melting temperature lowering effect can not be exhibited, while if the content of CaO is over 50 wt. %, the transparency of the antibacterial glass is lowered to the contrary.

Further, in view of the fact that the above-mentioned $Ag_2O$ becomes a cause of yellowing, it is preferable to set the content of CaO which exhibits the yellowing preventing function in view of the content of $Ag_2O$.

To be more specific, it is preferable to set the weight ratio expressed by $CaO/Ag_2O$ to a value within a range of 5 to 15.

Also, with respect to $B_2O_3$ and $P_2O_5$, those components directed to the glass formulation 2 can be similar to those of the glass formulation 1.

Further, with respect to $CeO_2$, MgO, $Na_2O$, $Al_2O_3$, $K_2O$, $SiO_2$, BaO and the like, the second embodiment can have the same components and content as those of the first embodiment.

(1)—3 Glass composition 3

A borosilicate glass as an antibacterial alkaline glass contains $B_2O_3$, $SiO_2$, $Ag_2O$, and an alkali metal oxide, wherein, with reference to the total amount of 100 wt. %, the content of $B_2O_3$ is set to be a value within the range of 30 to 60 wt. %, $SiO_2$ is set to be a value within the range of 30 to 60 wt. %, $Ag_2O$ is set to be a value within the range of 0.2 to 5 wt. %, the alkali metal oxide is set to be a value within the range of 5 to 20 wt. %, and $Al_2O_3$ is set to be a value within the range of 0.1 to 2 wt. %.

When the total amount is less than 100 wt. %, the balance is preferably filled with other glass component (for example, alkali metal oxide, $CeO_2$, CoO, etc.) in a proportion of 0.1 to 33 wt. %.

Here, in the antibacterial alkaline glass, $B_2O_3$ basically performs the function of the network-forming oxide, and $B_2O_3$ also relates to the transparency improving function of the antibacterial glass and the uniform releasing property of an Ag (silver) ion in the present invention.

Also, $SiO_2$ basically performs the function of the network-forming oxide, and $SiO_2$ performs the yellowing preventing function.

Moreover, $Ag_2O$ is an indispensable constituent component in the antibacterial glass of the present invention. The antibacterial glass which exhibits excellent antibacterial property for a long period can be produced by melting a glass component so as to release an Ag ion.

Further, an alkaline metal oxide such as $Na_2O$ and $K_2O$ basically performs the function of network-modifying oxide and, at the same time, performs the function of lowering heating temperature as well as lowering the water resistance, hence controlling the elution of Ag ion from the antibacterial glass.

Still further, an alkaline earth metal oxide such as MgO and CaO basically performs the function of network-modifying oxide and, at the same time, performs the transparency improving function of the antibacterial glass as well as the function of lowering heating temperature.

Others, if $CeO_2$, $Al_2O_3$ and the like are added, color change prevention, transparency and the mechanical strength of the antibacterial glass could be improved.

(2) Volume Average Particle Diameter

Also, it is preferred that the volume average particle diameter (Volume average primary particle diameter: D50) of the antibacterial glass is set to be a value within a range of 0.1 to 10 μm.

The reason is that, by setting the volume average particle diameter in the specific range, it would be possible to disperse the antibacterial glass more uniformly and to process the antibacterial resin composition to the antibacterial fiber and the antibacterial film stably.

Thus, if the volume average particle diameter is below of 0.1 μm, there are cases that mixing and dispersing of the antibacterial glass into a resin becomes difficult, the light scattering would occur and the transparency would be decreased.

On the other hand, if the volume average particle diameter is over 10 μm, there are cases that mixing and dispersing of the antibacterial glass into a resin becomes difficult, the surface flatness, transparency and the mechanical strength would be greatly decreased, when the antibacterial fiber and the antibacterial film are manufactured.

Accordingly, it is more preferred that the volume average particle diameter is set to be a value within a range of 0.5 to 5 μm, and more preferred that the volume average particle diameter is set to be a value within a range of 1 to 3 μm.

With respect to the antibacterial fiber and the antibacterial film, the most preferred volume average particle diameter will be explained layter.

Here, the volume average particle diameter of the antibacterial glass can be easily measured using a laser type particle counter (In accordance with JIS Z 8852-1), a settling type particle size distribution meter or based on an electron microscope photograph of the antibacterial glass.

(3) Specific Surface Area

Also, it is preferred that the specific surface area of the antibacterial glass is set to be a value within a range of 10,000 to 300,000 $cm^2/cm^3$.

The reason is that, if the specific surface area is below of 10,000 $cm^2/cm^3$, there are cases that mixing and dispersing of the antibacterial glass into a resin becomes difficult, the light scattering would occur and the transparency would be decreased when the antibacterial fiber and the antibacterial film are manufactured.

On the other hand, if the specific surface area is over 300,000 $cm^2/cm^3$, there are cases that mixing and dispersing of the antibacterial glass into a resin becomes difficult, the light scattering would occur and the transparency would be decreased Accordingly, it is more preferred that the specific surface area of the antibacterial glass is set to be a value within a range of 15,000 to 200,000 $cm^2/cm^3$, and more preferred that the specific surface area is set to be a value within a range of 16,000 to 180,000 $cm^2/cm^3$.

Here, the specific surface area ($cm^2/cm^3$) of the antibacterial glass can be measured the particle distribution measurement result wherein such surface area is calculated from the experimental particle distribution chart as the specific surface ($cm^2$) as per the unit volume ($cm^3$).

(4) Shape

Also, the shape of the antibacterial glass is favorably polyhedron, and is constituted of a plurality of angles and faces. For example, the antibacterial glass is formed of a polyhedron glass which is made of hexahedron to icosahedron.

The reason is that, by forming the shape of the antibacterial glass into polyhedron, different from antibacterial glass having a spherical shape, light can easily progress or advance in a fixed direction in plane.

Accordingly, light scattering derived from the antibacterial glass can be effectively prevented whereby it is possible to enhance the transparency of the antibacterial glass.

Further, by forming the antibacterial glass into polyhedron, not only mixing and dispersing of the antibacterial glass into a resin are facilitated but also the orientation of the antibacterial glass in a fixed direction is facilitated when an injection molding is performed. Accordingly, the uniform dispersion of the antibacterial glass into a resin is facilitated and, at the same time, light scattering due to the antibacterial glass into a resin can be effectively prevented.

Still further, when the antibacterial glass has the shape of a polyhedron in this manner, the antibacterial glass is hardly reflocculated at the time of production or use thereof and hence, control of an average particle size of the antibacterial glass at the time of producing the antibacterial glass and handling of the antibacterial glass at the time of using the antibacterial glass in the producing steps can be facilitated.

(5) Externally Deposited Particle

Also, it is preferred that the aggregated (aggregation) silica particles (wet silica as hydrophilic silica and fumed silica as hydrophobic silica) are externally deposited to the antibacterial glass.

Of course, as long as it is composed mainly of the aggregated silica particle, even in combination or alone or two or more kinds of titanium oxide, zinc oxide, aluminum oxide, zirconium oxide, calcium carbonate, shirasu balloon, silica particles, glass balloon and the like would be used.

In particular, among these, the aggregated silica particle (wet silica, fumed silica), or the colloidal silica which is an aqueous dispersion is a favorable externally deposited particle since its average primary particle diameter is small, and dispersibility for the antibacterial glass is very good.

In other words, since the aggregated silica particle looses the aggregation state and disperses, it is adhered to the periphery of the antibacterial glass and it is possible to uniformly disperse the antibacterial glass into the resin.

The reason is that the secondary average particle size of the externally deposited particles is set to be the value within a range of 1 to 15 μm is as follows.

That is, if the average particle size of the externally deposited particles is below of 1 μm, there are cases that the dispersion effect of the antibacterial glass would be shortened and the transparency would be decreased based on the light scattering.

On the other hand, if the average secondary particle size of the externally deposited particles is over 15 μm, there are cases that the mixing—dispersing property or the handling property of the antibacterial glass into the resin component would be difficult, the surface flatness, transparency and the mechanical strength would be decreased, when the antibacterial fiber and the antibacterial film are manufactured.

Accordingly, it is more preferable to set the secondary average particle size of the externally deposited particles to a value within a range of 5 to 12 µm, and still further preferable a value within a range of 6 to 12 µm.

Here, the average particle size of the externally deposited particles can be easily measured using a laser type particle counter (In accordance with JIS Z 8852-1), a settling type particle size distribution meter or based on an electron microscope photograph of the antibacterial glass.

When the externally deposited particles are aggregated, such particles should be loosened and counted. So, it is preferred that the average primary particle size is set to be a value within the range of 0.005 to 0.5 µm.

The reason is that if the average primary particle size of the externally deposited particle is below of 0.005 µm, there are cases that the dispersion effect of the antibacterial glass would be shortened and the transparency would be decreased based on the light scattering.

On the other hand, if the average primary particle size of the externally deposited particle is over 0.5 µm, there are cases that the dispersion effect of the antibacterial glass would be shortened as well, the mixing—dispersing property of the antibacterial glass into the resin component would be difficult, the surface flatness, transparency and the mechanical strength would be decreased.

Accordingly, it is preferred that the average primary particle size is set be the value within the range of 0.01 to 0.2 µm and it is more preferred that the average primary particle size is set be the value within the range of 0.02 to 0.1 µm.

Note that the average primary particle size of the externally deposited particles could be measured by the same method as the average secondary particle size.

Also, the content of the aggregated silica particle as the externally deposited particles is set to be the value within the range of 0.1 to 50 pbw with respect to 100 pbw of the antibacterial glass.

The reason is that if the content of the aggregated silica particle is below of 0.1 pbw, the dispersibility of the antimicrobial glass becomes remarkably poor.

On the other hand, if the content of the aggregated silica particle is over 50 pbw, the obtained antibacterial resin composition reduces the transparency, or it would be difficult to uniformly mix with the antibacterial glass.

Accordingly, the content of the aggregated silica particle as the externally deposited particles is favorably set to be the value within the range of 0.5 to 30 pbw with respect to 100 pbw of the antimicrobial glass, and is more favorably set to be the value within the range of 1 to 10 pbw.

(6) Moisture Content

Also, when the moisture is contained in the antibacterial glass, it would be preferred to set the moisture content to the value within the range of $1 \times 10^{-4}$ to 5 wt. % with respect to 100 wt. % of the solid component of the antibacterial glass.

The reason is that, by controlling the moisture content in the specific range, in case of omitting the drying process of the antibacterial glass when manufacturing the antibacterial resin composition, it would be possible to prevent the hydrolysis of the polyethylene terephthalate resin as the main component and to uniformly disperse the antibacterial glass.

That is, if the moisture content is below of $1 \times 10^{-4}$ wt. %, the large scale drying facilities of the antibacterial glass, it takes excessively long time to dry the antibacterial glass.

On the other hand, if the moisture content is over 5 wt. %, it would be difficult to stably prevent the hydrolysis of the polyethylene terephthalate resin as the main component, even the polybutylene terephthalate resin is used for the master batch.

Accordingly, it is more preferred that the moisture content is set to be the value within the range of $1 \times 10^{-3}$ to 1 wt. % with respect to 100 wt. % of the solid component of the antibacterial glass, and the most preferred that the moisture content is set to be the value within the range of $1 \times 10^{-2}$ to $1 \times 10^{-1}$ wt. %.

Here, the moisture content of the antibacterial glass could be measured in accordance with the heating-weight loss method at 105° C. by using the electronic moisture meter or the Karl Fischer method.

(7) Content

Also, the present the antibacterial resin composition is characterized in that the content of the antibacterial glass is set to be the value within the range of 0.1 to 10 pbw with respect to 100 pbw of the polyethylene terephthalate resin.

The reason is that, by controlling the content of the antibacterial glass in the specific range, it would be possible to prevent the hydrolysis of the polyethylene terephthalate resin and to uniformly disperse the antibacterial glass in the resins, hence to show the good antibacterial effect.

That is, if the antibacterial glass content is below of 0.1 pbw, the absolute value of the antibacterial glass becomes low and it would be difficult to show the sufficient antibacterial effect as the antibacterial resin composition.

On the other hand, if the antibacterial glass content is over 10 pbw, it would be difficult to prevent the hydrolysis of the polyethylene terephthalate resin with the increase of the moisture content corresponding to the antibacterial glass content. Further, it would be difficult to prevent the hydrolysis of the polyethylene terephthalate resin as the main component.

Accordingly, it is more preferred that the content of the antibacterial glass content is set to be the value within the range of 0.15 to 1 pbw with respect to 100 pbw of the polyethylene terephthalate resin, and the most preferred that the antibacterial glass content is set to be the value within the range of 0.2 to 0.5 pbw.

Here, the antibacterial glass content means the total weight of the antibacterial glass and the water content if the antibacterial glass includes the moisture.

4. (D) Component: Dispersing Aid Agent

Also, it is preferred that the present antibacterial resin composition derived from the master batch include a dispersing aid agent of, the antibacterial glass as component (D).

The reason is that, by including such dispersion aid agent, the antibacterial glass could be more uniformly dispersed into the resins.

(1) Kind

As for the kind (type) of the dispersion aid agent, it is not particularly limited, but the aliphatic amide based fatty acids dispersion aid agent, the hydrocarbon dispersing dispersion aid agent, fatty acids dispersion aid agent, higher alcohols type dispersion aid agent, metal soaps dispersion aid agent, ester-based dispersion aid agent, for example, could be used. Especially, aliphatic amide-based dispersing agents are particularly preferred.

Further, the aliphatic amide based fatty acids dispersion aid agent is separated in two groups such as fatty acid amide (namely amide stearate, oleic acid amide, erucic acid amide, etc.) and alkylene fatty acid amide (namely methylene bis-stearic amide, ethylene bis-stearic amide, etc.), but the alkylene fatty acid amide is more preferred for the present use.

The reason is that, alkylene fatty acid amide does not reduce the thermal stability of the resin composition and improves the dispersibility of the antibacterial glass with compared to fatty acid amide.

Also the use of ethylene bis-stearic acid amide is particularly preferred since it has a melting point of 141.5 to 146.5° C. and has good heat stability during the molding of the antibacterial resin composition.

(2) Content

Also, it would be preferred that the content of the dispersion aid agent is set to be the value within the range of 1 to 20 pbw with respect to 100 pbw of the antibacterial resin composition.

The reason is that, if such content of the dispersion aid agent is below of 1 pbw, it is lack of the absolute amount of the dispersion aid agent, and it would be difficult to improve the dispersibility of the antibacterial glass for the resin component.

On the other hand, if the content of the dispersion aid agent is over 20 pbw, the mechanical properties such as tear strength and tensile strength in the antibacterial resin composition would decrease or easier to breed out or from.

Accordingly, it would be preferred that the content of the dispersion aid agent is set to be the value within the range of 3 to 12 pbw with respect to 100 pbw of the antibacterial resin composition, and more preferred that it is set to be the value within the range of 5 to 8 pbw.

Second Embodiment

The second embodiment is an antibacterial fiber and is an antibacterial film formed by processing the antibacterial resin composition derived from the master batch of the first embodiment.

Hereinafter, the antibacterial fiber and antibacterial film as the second embodiment will be specifically described without overlapping explanation of the first embodiment.

1. Antibacterial Fiber (1) Diameter

It is preferred that a diameter of the antibacterial fiber is set to be a value within a range of 10 to 30 μm.

The reason is that, if the diameter of the antibacterial fiber is below of 10 μm, the mechanical strength of the antibacterial fiber decreases and it becomes difficult to stably manufacture it.

On the other hand, if the diameter of the antibacterial fiber is over 30 μm, the flexibility of the antimicrobial fiber would be lost and its usage excessively becomes restrictive.

Accordingly, it is more preferred that a diameter of the antibacterial fiber is set to be a value within a range of 12 to 25 μm, and still more preferred that a diameter of the antibacterial fiber is set to be a value within a range of 15 to 20 μm.

Here, the diameter of the antibacterial fiber could be measured by using an electron microscope and a micrometer as well as a caliper.

Further, it should be noted that, in taking account of the diameter of the antibacterial fiber, in particular, the volume average particle diameter (D50) of antibacterial glass is favorably set to be a value within the range of 0.3 to 3 μm, and more favorably set to be a value within the range of 0.8 to 1.5 μm.

(2) Manufacturing Method

Also, as for a manufacturing method of the antibacterial fiber, it is not restricted but the well known methods could be available.

For example, after melting antibacterial resin composition in the pack under the spinning temperature at 250 to 350° C., it is preferred that the antibacterial resin composition is discharged from a nozzle cap of 36 holes (diameter: 10 to 30 μm), and is spinned at the speed of 2000 to 5000 m/minutes to obtain the antibacterial fiber.

In addition, when the yarn, for example, is made from the non-antimicrobial fibers of 20 in number, it is sufficient to use one antimicrobial fiber to obtain an antibacterial yarn.

Therefore, if the antibacterial colored yarn is manufactured, it is sufficient to incorporate a coloring agent into the non-antimicrobial fiber and it is not necessary to incorporate a coloring agent into the antimicrobial fiber. So, it is possible to omit the adding of a colorant into an antimicrobial fiber, a variety of colored yarn could be produced based on the non-antimicrobial fibers with ease.

2. Antibacterial Film (1) Thickness

It would be preferred that the thickness of the antibacterial film is set to be a value within the range of 2 to 2,000 μm.

The reason is that, if the thickness of the antibacterial film is below of 2 μm, the mechanical strength of the antibacterial film would decrease, or it becomes difficult to manufacture the antibacterial film stably.

On the other hand, if the thickness of the antibacterial film is over 2,000 μm, the flexibility of antibacterial film would be lost, and its usage is excessively restricted.

Accordingly, it would be more preferred that the thickness of the antibacterial film is set to be a value within the range of 5 to 200 μm, and still more preferred to be a value within the range of 10 to 100 μm.

On the other hand, in the case of film for the touch panel, etc. it would be more preferred that the thickness of the antibacterial film is set to be a value within the range of 300 to 1,500 μm, and still more preferred to be the values within the range of 500 to 1,000 μm.

In addition, the thickness of the film like this antibacterial could be measured by an electron microscope, a micrometer, and calipers.

It should be noted that, in the antibacterial film, in particular, the volume average particle diameter (D50) of antibacterial glass is set be a value within the range of 1 to 8 μm, more preferably 2 to 5 μm.

(2) Polycarbonate Resin

Also, in the antimicrobial film, from the purpose of improving the durability, it is also preferred to add a polycarbonate resin as a resin component into a polybutylene terephthalate resin and a polyethylene terephthalate resin.

In this case, it is preferred to add 0.1 to 50 pbw of the polycarbonate resin to 100 pbw of the polyethylene terephthalate resin, is more preferred to add 1 to 30 pbw of the polycarbonate resin, and still more preferred to add 5 to 25 pbw of the polycarbonate resin.

(3) Manufacturing Method

Also, as for a manufacturing method of the antibacterial film, it is not restricted but the well known methods could be available.

For example, the antibacterial resin composition is melted under the temperature conditions at 250 to 350° C. and is extruded from the die to obtain an unstretched film.

Then, the unstretched film is preheated in the range of 30 to 90° C., is also stretched between the low speed roller and the high sped roller in the film forming direction, and is also stretched in the transverse direction to obtain the antibacterial film as an biaxially oriented film.

Third Embodiment

Third embodiment is a method for manufacturing the antibacterial resin composition derived from a master batch comprising a polyethylene terephthalate resin as the component (A), and a polybutylene terephthalate resin as the component (B), and an antibacterial glass which elutes silver ions as a component (C), which is characterized by including the following first step (a) and the second step (b).

(a) 5 to 40 pbw of the antibacterial glass as a component (C) is added to 100 pbw of the polybutylene terephthalate resin as a component (B), mixed and dispersed to obtain a master batch as the first step.

(b) 0.5 to 25 pbw of the master batch is added to 100 pbw of the polyethylene terephthalate resin as a component (A), mixed and dispersed to obtain the antibacterial resin composition derived from a master batch comprising below as the second step.

(A) a polyethylene terephthalate resin: 100 pbw
(B) a polybutylene terephthalate resin: 0.5 to 25 pbw
(C) an antibacterial glass: 0.1 to 10 pbw Hereinafter, the method for manufacturing the antibacterial resin composition derived from a master batch of the third embodiment will be concretely described while omitting the same contents of the first embodiment.

1. Mixing Process of Glass Raw Materials, Melting and Cooling Process

Firstly, after accurately weighed glass raw materials, such glass raw materials are mixed uniformly.

Also, in mixing the glass raw materials, it would be preferred to use a universal mixer (planetary mixer), an alumina porcelain ulcers future machine, a ball mill, and a propeller mixer.

It should be noted, for example, in case of using a universal mixer for stirring and mixing the raw materials, the number of rotation is 250 rpm, the number of revolution is 100 rpm under the time condition of 10 min. to 3 Hrs.

Then, the uniformly mixed glass raw materials are melted, for example, by using a glass melting furnace to obtain a melt glass.

Also, as for the melting conditions, for example, the melting temperature is favorable in the range of 1100 to 1500° C. and the melting time is 1 to 8 Hrs.

The reason is that, if the melting conditions like this, the production efficiency of the melt glass increases, and color change of the antibacterial glass during manufacturing could be reduced as much as possible.

It is preferred that after obtaining such melt glass, the melt glass is cooled by pouring into the flowing water as well as water grinding to obtain the glass body.

2. Grinding Process of Antibacterial Glass

Then, the obtained glass body is crushed to the antimicrobial glass which shape is a polyhedron, and has the specific average particle size.

More specifically, as shown in the following process, a course crushing process, a grinding process in medium size, and a fine grinding process are carried out.

By carrying out like this, it would be possible to efficiently obtain the antimicrobial glass having a uniform average particle size.

Here, for some applications, it is also preferred that a classification step is further carried out, etc. after the grinding process, to control the average particle diameter in smaller size.

(1) Coarse Crushing Process

The coarse crushing process is a step of grinding the glass body, so that the volume average particle diameter of the glass body should be about 10 mm.

More specifically, when the melt glass in a molten state is granulated by water crushing, crushing the non-shape glass by hand or hammer etc. to be a glass body, it is preferred that the glass body has the specific average particle diameter Here, it is confirmed that the antibacterial glass after a coarse grinding process usually has a shape having no corners by using an electron micrographs.

(2) Grinding Process in the Middle Size

A grinding process in the middle size is a step of grinding the antibacterial glass after a coarse grinding process to obtain the antibacterial glass having the volume average particle diameter of about 1 mm.

More specifically, it is preferred that the antibacterial glass having the volume average particle diameter of about 10 mm is crushed to the antibacterial glass having the volume average particle diameter of about 5 mm by using a ball mill, for example. Then, it is preferred that the obtained antibacterial glass is crushed to the antibacterial glass having the volume average particle diameter of about 1 mm by using a rotary mill or a rotary rollers (rolling crusher), for example.

The reason is that, by performing the grinding process in the middle size as one of the multi-stage grinding process, it would be possible to effectively obtain an antibacterial glass having a prescribed particle size without causing the crushed antibacterial glass which is excessively small particle size.

Here, as for the antibacterial glass after a grinding process in the middle size, it is confirmed that such antibacterial glass is a polyhedron having a corner by using an electron micrographs.

(3) Fine Grinding Process

A fine groudning process is a step of crushing for the antibacterial glass after a grinding process in the middle size on the condition that aggregated silica particles having the volume average particle diameter of 1 to 15 µm as the external additives is present, to obtain the antibacterial glass having the volume average particle diameter of 0.1 to 10 µm.

More specifically, the antibacterial glass after a grinding process is crushed by using a rotary mill, a rotary roller (rolling crusher), a vibration mill, a vertical mill, a dry type ball mill, a planetary mill, a sand mill, or a jet mill, for example.

Among these dry type crushing mills, in particular, the use of a vertical mill, a dry type ball mill, a jet mill and a planetary mill are preferred.

The reason for this is that, by performing the fine grinding process based on the vertical mill and the planetary mill, it would be possible to give a moderate shear force and to effectively obtain a polyhedron antibacterial glass having a prescribed particle size and without causing the crushed antibacterial glass which is excessively small particle size.

Figure 2:
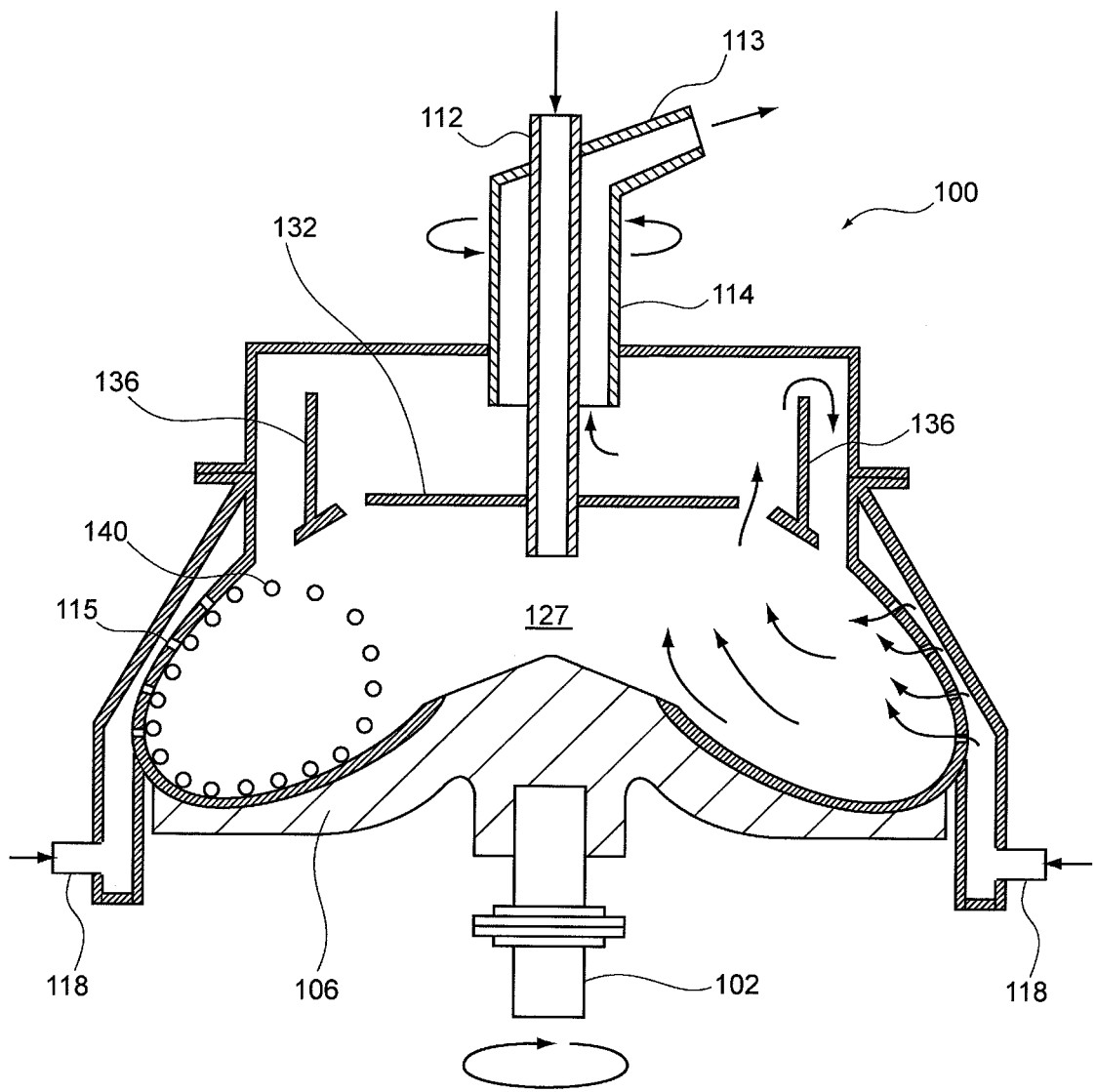
FIG. 2 illustrates a diagram for explaining the vertical type mill.

Here, as shown in FIG. 2, a vertical mill 100 is a dry type grinder, wherein the grinding chamber 127 was surrounded by the rotation plate 106, the rotating disc 132, and a stirring blade 136.

Further, into the grinding chamber 127, the grinding media 140 and articles to be crushed are charged. While rotating the rotation plate 106, the air was introduced from the air introducing tube 118, fine-grained fraction is recovered through the duct 113, and coarse particles are returned to the grinding chamber 127.

Also, the dry type ball mill is a generic term for a dry type mill wherein the grinding media was charged with grinding media and articles to be crushed in the container, and the grinding process is carried out in a dry state by rotating the container.

Figure 3:
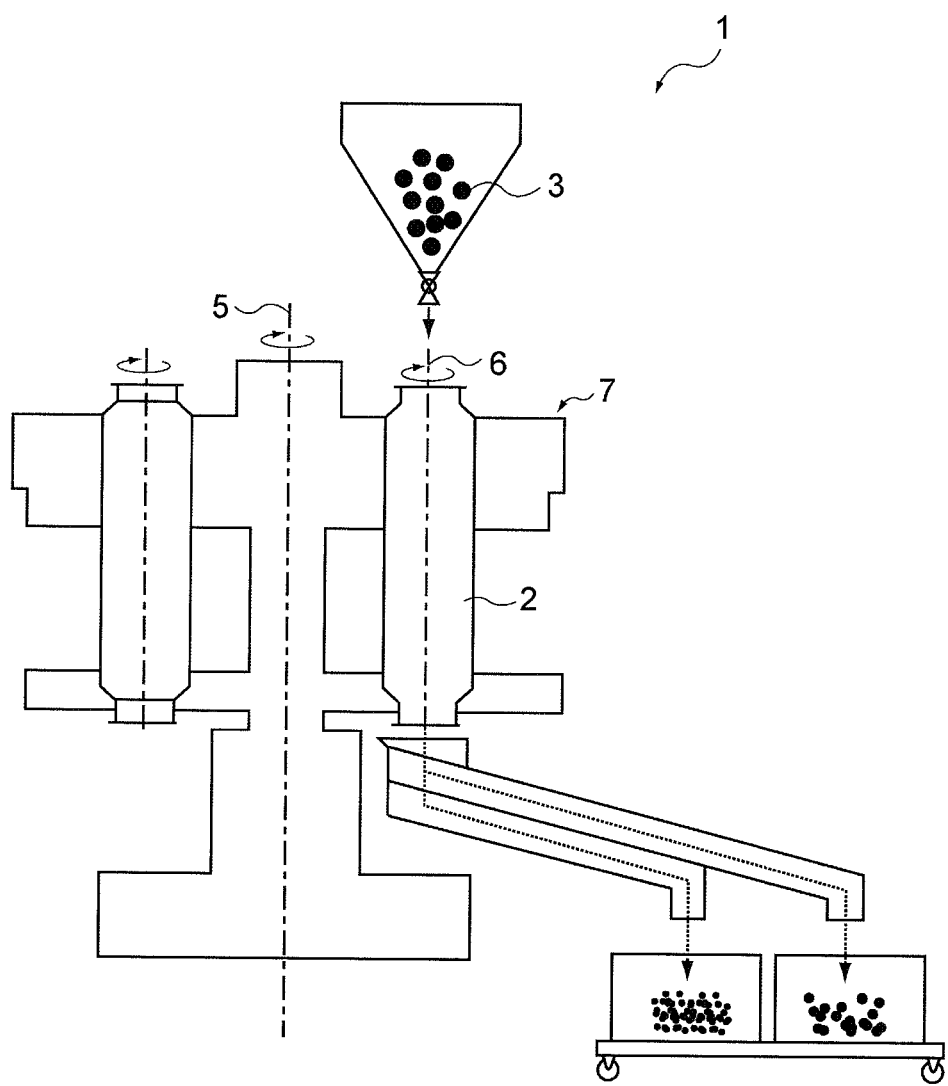
FIG. 3 illustrates a diagram for explaining the planetary mill.

Further, a planetary mill 1 as shown in FIG. 3, is a generic term for a dry type mill wherein both the axis of the revolution direction 5 and the axis of the rotations direction 6 are in the vertical direction together and articles 3 to be crushed is charged in the crushing container 2 and crushed by rotating the container.

Still further, the jet mill is a generic term for a dry type mill without the use of the grinding media in a container. Namely, the articles to be crashed are collided each other for grinding by rotating the container.

More specifically, when using a vertical mill, a dry type ball mill, and a planetary mill, and the like, it is preferred that the grinding alumina balls or zirconium balls are used as the media 4, the rotation speed for the vessel is 30 to 100 rpm, and the processing time of the antibacterial glass obtained by the grinding process in the middle size is should be for 5 to 50 Hrs.

In addition, when using a jet mill, it is preferred that the antibacterial glasses obtained by the grinding process in the middle size are accelerated in the vessel at a pressure of 0.61 to 1.22 MPa (6 to 12 Kgf/cm$^2$), and to collide with each other.

Here, as for the antibacterial glass after a fine grinding process by using the dry type ball mill or a jet mill and the like, it is confirmed that such antibacterial glass is a polyhedron having more corners and is easier to control the volume average particle diameter (D50) and specific surface area in the specific range, than the antibacterial glass after the grinding process in the middle size by using an electron micrographs.

Also, in case of fine grinding process by using a planetary mill etc., it would be preferred that a fine grinding process is carried out on the condition that substantially dry condition is maintained such as 20% Rh, for example.

This is because that the antibacterial glass could be stirred and circulated without aggregation by using the planetary mill with classification device such as a cyclone.

Thus, by regulating the circulation numbers in the specific range, it would be possible to easily control the volume average primary particle diameter of the antibacterial glass and its particle distribution in the specific range. Further, it would be possible to omit the drying process of the antibacterial glass after the fine grinding process.

On the contrary, it would be possible to easily recover the antibacterial glass which size is below the specific range by using the bag filter, if the antibacterial glass is in the drying condition. Thus, it would be easy to control the volume average particle diameter of the antibacterial glass and its particle distribution in the specific range.

3. The First Step (a): Manufacturing Process of the Master Batch

Then, after the obtained the antibacterial glass is added into the polybutylene terephthalate resin, such antibacterial glass is mixed and dispersed to obtain a master batch as the first step (a).

The reason is that, by dispersing the antibacterial glass into the polybutylene terephthalate resin which is excellent in the hydrolysis resistance to produce a master batch, not into the polyethylene terephthalate resin, it would be possible to effectively prevent the hydrolysis when the master batch is produced a master batch wherein polyethylene terephthalate resin is a main component.

In other words, the concentration of the antimicrobial glass in the master batch is 50 times, for example, as the concentration of the antimicrobial glass in the antibacterial resin composition which is finally obtained.

Therefore, in the master batch, with the increase of the concentration of the antibacterial glass, the moisture content in the antibacterial glass would increase correspondingly.

As a result, if the master batch is prepared from a polyethylene terephthalate resin as a resin component, not a polybutylene terephthalate resin which hydrolysis resistance is better than the polybutylene terephthalate resin, the main resin component of the master batch would be significantly hydrolyzed.

On the other hand, if the antibacterial resin composition is manufactured from the polybutylene terephthalate resin and the antibacterial glass which content is the final concentration without via the master batch, the dispersibility of the antibacterial glass or dispersing efficiency remarkably decreases. Further, the considerable heat process and long mixing time would be excessively required in order to uniformly disperse the antibacterial glass.

Therefore, it could prevent effectively the hydrolysis of the resin component of the master batch by manufacturing a master batch using a polybutylene terephthalate resin which is excellent in the hydrolysis resistance more than the polyethylene terephthalate resin as a resin component.

Note that, in general, the melting point of the polybutylene terephthalate is lower than that of the polyethylene terephthalate resin, which has been known.

Because of this, it would be possible to suppress the total amount of the required heat and a mixing time during the production of a master batch by producing a master batch using the polybutylene terephthalate resin as a resin component.

Therefore, it is also one of the reasons that the resin component of the master batch is less susceptible to hydrolysis when the master batch is prepared using the polybutylene terephthalate resin as a resin component.

Also, when manufacturing a master batch, it is characterized in that the amount of addition of antibacterial glass is set to be a value within the range 5 to 40 pbw with respect to 100 pbw of the polybutylene terephthalate resin The reason is that, if the content of the antibacterial glass is below of 5 pbw when manufacturing a master batch, the content of the antibacterial glass is excessively low in the antibacterial resin composition which is finally obtained is excessively low, and it would be difficult to show the sufficient antimicrobial effect.

On the other hand, if the content of the antibacterial glass is over 40 pbw when manufacturing a master batch, there would be the case that the hydrolysis of the polybutylene terephthalate resin as the resin component of the antibacterial resin composition would be occurred.

In addition, there would be the case that the hydrolysis of the polyethylene terephthalate resin as the main component in the antibacterial resin composition finally obtained would be occurred.

Accordingly, it is preferred that the content of the antimicrobial glass is set to be a value within the range of 10 to 30 pbw with respect to 100 pbw of the polybutylene terephthalate resin, and is more preferred that preferred that the content of the antimicrobial glass is set to be a value within the range of 20 to 25 pbw.

In addition, the production of a master batch could be carried out by a conventionally known method.

More specifically, with the addition of the antibacterial glass for the polybutylene terephthalate resin, it would be possible to use a biaxial kneading extruder, for example, for 150 to 300 rpm and at 250 to 350° C. to mix and disperse the antibacterial glass, hence the antibacterial resin composition is extruded from the small round hole of 1 to 5 mm in diameter at the extruding rate of 20 to 40 kg/Hr.

In addition, the shape of the master batch is not particularly limited, but, for example, it is preferred that the cylindrical pellet having 1 to 5 mm of the diameter, and 1 to 10 mm of the length.

4. The Second Step (b): Manufacturing Process of the Resin Composition Comprising Antibacterial Derived from a Master Batch Subsequently, it would be preferred that the 0.5 to 25 pbw of the master batch is added to 100 pbw of the polyethylene terephthalate resin, mixed and dispersed to obtain the antibacterial resin composition derived from a master batch having the following formulation.

(A) a polyethylene terephthalate resin: 100 pbw
(B) a polybutylene terephthalate resin: 0.5 to 25 pbw
(C) an antibacterial glass: 0.1 to 10 pbw The reason is that by mixing and dispersion the master batch which is obtained in first step (a) with the polyethylene terephthalate resin as the main component, the hydrolysis of the polyethylene terephthalate resin is effectively prevented and the antibacterial resin composition wherein the antibacterial is uniformly dispersed, could be obtained.

That is, the high concentration of the antibacterial glass containing high moisture content, in a state of being dispersed into the polybutylene terephthalate resin which hydrolysis resistance comparatively is excellent is relatively inferior to the hydrolysis resistance that will be mixed and dispersed in the polyethylene terephthalate resin.

Therefore, the high concentration of the antibacterial glass which would be the origin of the hydrolysis is mixed and dispersed into the polybutylene terephthalate resin. Namely, the antibacterial glass is coated by the polybutylene terephthalate resin and such coated antibacterial glass is mixed and dispersed in the polyethylene terephthalate resin.

Thus, for example, in the stage of melt-kneading by a biaxial kneading machine, etc., or the stage where the hydrolysis of the polyethylene terephthalate resin is most likely to occur, the polyethylene terephthalate resin and the antibacterial glass is separated properly.

As a result, it is possible to obtain a resin composition that effectively suppresses the hydrolysis of the polyethylene terephthalate resin as the main component, and that the antimicrobial glass in a final concentration is uniformly dispersed in the resins.

Also, it is characterized in that the content of the master batch is set to be a value within the range of 0.5 to 25 pbw with respect to 100 pbw of the polyethylene terephthalate resin as the main component.

The reason is that, if such content is below of 0.5 pbw of the master batch, and the content of the antibacterial glass is also too low in the antibacterial resin composition finally obtained and it becomes difficult show the sufficient antimicrobial effect.

Further, it would be difficult to effectively prevent the hydrolysis of the polyethylene terephthalate resin, since the content of the polybutylene terephthalate resin becomes too low.

On the other hand, if such content is over 25 pbw of the master batch, it would be difficult to process the antibacterial resin compositions to the antibacterial fiber and the antibacterial film since the content of the polyetylene terephthalate resin becomes too low.

Accordingly, it is preferred that the content of the master batch is set to be a value within the range of 1 to 20 pbw with respect to 100 pbw of the polyetylene terephthalate resin as the main component and is set to be a value within the range of 2 to 15 pbw.

In addition, the mixing the master batch and the polyethylene terephthalate resin as the main component can be carried out by a conventionally known method.

More specifically, with the addition of the antibacterial glass for the polyethylene terephthalate resin, it would be possible to use a biaxial kneading extruder, for example, for 150 to 300 rpm screw rotations and at 250 to 350° C. of kneading temperature to mix and disperse the antibacterial glass, hence the antibacterial resin composition is extruded from the small round hole of 1 to 5 mm in diameter at the extruding rate of 20 to 40 kg/Hr.

EXAMPLE

The present invention is described by an embodiment in detail as follows. However, the following discussion shows the present invention illustratively, and the present invention is not limited for these descriptions.

Example 1

1. Production of Antibacterial Glass (1) Melting Process

Raw materials for the antibacterial glass consisting of 50 wt. % of $P_2O_5$, 5 wt. % of CaO, 1.5 wt. % of $Na_2O$, 10 wt. % of $B_2O_3$, 3 wt. % of $Ag_2O$, 0.5 wt. % of $CeO_2$, and 30 wt. % of ZnO, when the total amount of antibacterial glass is 100 wt. %, are mixed and stirred using a universal mixer under the conditions of 250 rpm and 30 minutes until they are uniformly mixed.

Then, using a melting furnace, the glass raw materials are heated under the conditions at 1280° C., for 3.5 Hrs to obtain the glass melt (molten glass).

(2) Grinding Process in the Middle Size

Then, the molten glass taken from the glass melting furnace was poured in the flowing water of 25° C. and water crushed to the course grinding glass which volume average particle diameter was about 10 mm.

It should be noted that it was confirmed that there are no corners or surface of the course grinding glass by using an optical microscope.

Then, by using a ball mill (media: zirconium balls of 10 mm diameter), the grinding process in the middle size was carried out.

Namely, the course grinding glass was fed from a hopper based on its own weight to the ball mill and the first middle size crushing process (volume average particle diameter: 1000 μm) was carried out to obtain the antibacterial glass crushed in the first middle size at the rotating speed of 120 rpm.

Then, by using a rotation roll, the antibacterial glass crushed in the first middle size was crushed to be the secondary crushed middle size by the first grinding conditions and the second grinding conditions.

Namely, in the first grinding conditions, the rotating speed was 30 rpm, and the roll gap was 1 mm. In the subsequent second grinding conditions, the rotating speed was 30 rpm and the roll gap was 0.25 mm.

Here, after second grinding, it was confirmed that the coarse grinding glass for at least 50 wt. % or more, is a polyhedron having some angles and surfaces by an electron microscopy.

Subsequently, 7 pbw of the aggregated silica particle (volume average primary particle diameter: 15 nm, volume average secondary particle diameter: 7 μm) was externally added to 100 pbw of the antibacterial glass (roughly pulverized glass).

Later, as a grinder, by using the vertical mill (manufactured by Ube Industries, Ltd.) in the following processing conditions, pulverizing treatment was carried out. Subsequently, an antimicrobial glass was obtained after the fine grinding process; remove them to separate the grinding media, agglomerated silica particles adhering to the surrounding area.

And, by using LA-300 (manufactured by Horiba Co., Ltd.) as a particle size distribution analyzer, it was confirmed that the volume average primary particle diameter (D50) of the antibacterial glass was 1 μm, and that the antibacterial glass has a specific surface area of 88,000 $cm^2/cm^3$.

Mill volume capacity: 4 little
Diameter of grinding media: 20 mm
The type of grinding media: Zirconium balls
The amount of grinding media: 4 kg
Antibacterial glass: 1 kg
Rotation speed 56 rpm:
Processing time: 15 hours Then, aggregated silica particles by using a rotation roll, the antibacterial glass crushed in the first middle size was crushed to be the secondary crushed middle size by the first grinding conditions and the second grinding conditions.

Here, it was confirmed that the coarse grinding glass at this stage for at least 96 wt. % or more, is a polyhedron having some angles and surfaces by an electron microscopy. Also, it was confirmed that the aggregated silica particles are externally deposited to the surface of the antibacterial glass.

Furthermore, there is a case is referred to as "GL-A", the following antibacterial glass, used in example 1.

In addition, the obtained antibacterial glass was dried under the conditions at 120° C., for three hours, and moisture content was regulated to be the value of 0.0005 wt. %.

2. Production Process of a Master Batch (Step (a))

Then, 10 pbw of the obtained antibacterial glass, and 1.5 pbw of the ethylene bis-amide (made by Kao Co., Ltd., Kao wax EB-FF) as dispersing aids compound were added to the 100 pbw of the polybutylene terephthalate resin (made by Toray Co., Ltd., Torekon 1401×06), and the specific pellet in diameter of 2 mm and cylindrical length of 3 mm as the master batch, was obtained by mixing and dispersing using a two axis extruder (made by Berusutorufu Co), at a temperature of 270° C., at the screw rotation speed of 200 rpm, and at an automatic extrusion rate of 30 kg/Hr by extruding from a small circular hole of 2 mm.

It should be noted that, in a two axis extruder, as a filter for the heating filtration, a stainless steel woven wire mesh was used (400 mesh).

Herein after, sometimes referred to as "PBT-a" is used as a polybutylene terephthalate resin described above in example 1.

3. Production Process of a Bacterial Fiber

Then, after the addition of 1.1 parts by weight of master batch (made by Toray Co., Ltd., Lumirror) with respect to 100 parts by weight, were obtained, the static mixer the molten polymer minute 45 g/total discharge amount of polyethylene terephthalate resin after melt blending under the conditions of 270° C. in the pack at the nozzle cap of 36 holes (made) Co., Ltd. (Kenikkusu) discharged from them (diameter 10 μm), spinning in spinning speed3000 m/min, antibacterial of 30 μm diameter fibers were obtained.

Figure 4:
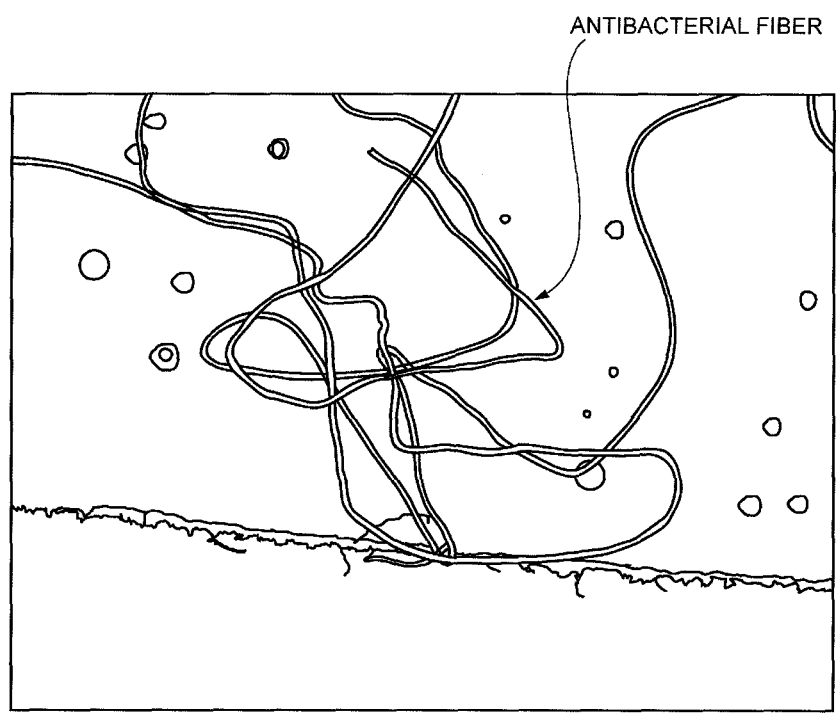
FIG. 4 illustrates a SEM photo (×30) of the antibacterial fiber in example 1.
Figure 5:
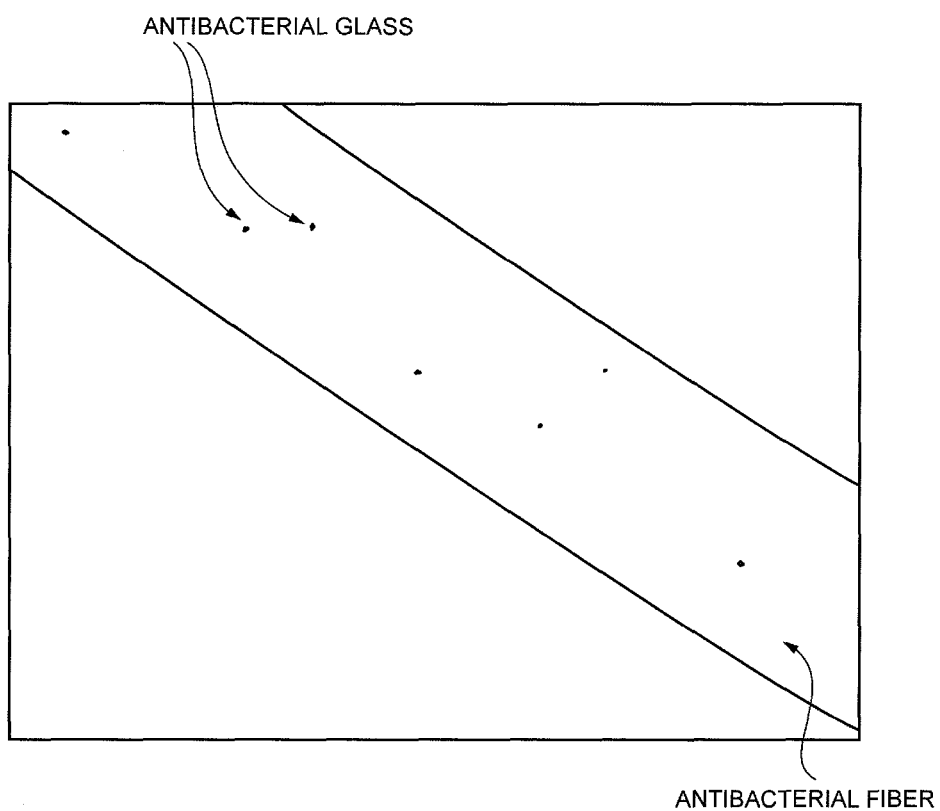
FIG. 5 illustrates a SEM photo (×1,100) of the antibacterial fiber in example 1.
Figure 6:
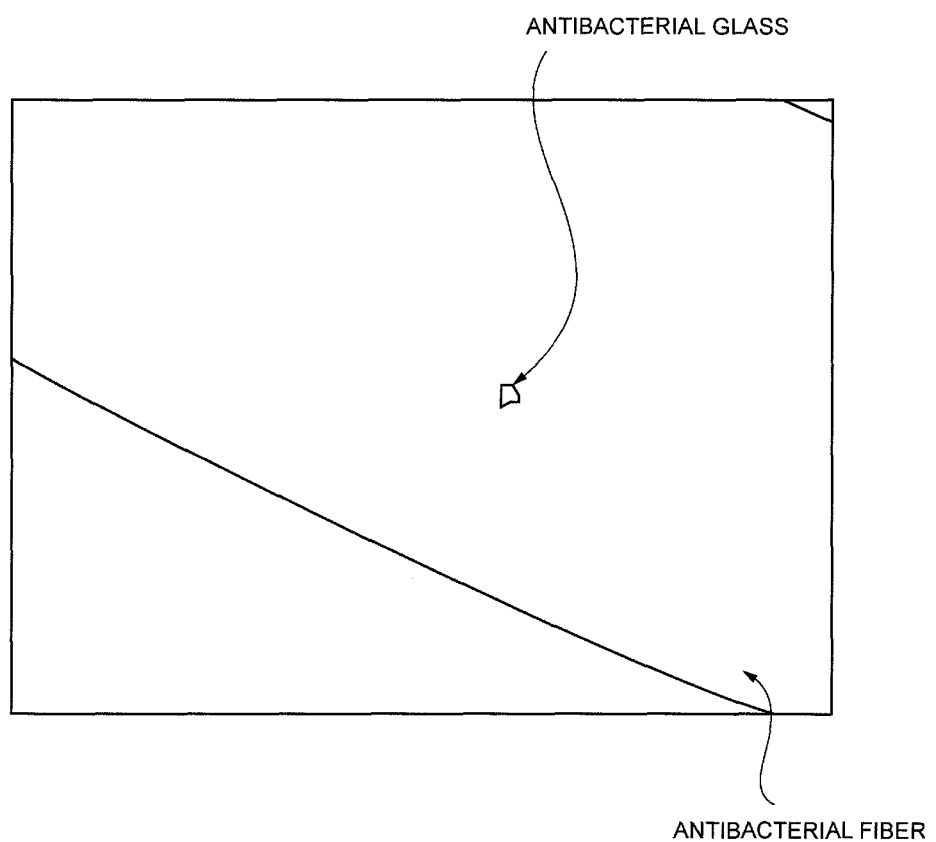
FIG. 6 illustrates a SEM photo (×3,000) of the antibacterial fiber in example 1.

It should be noted that, FIGS. 4 to 6 show the substitute figure for SEM photograph of the obtained antimicrobial fibers (×30, ×1,100 and ×3,000).

This is because the image quality would be degraded in the patent gazette, if SEM photo is used as a drawing.

Hereinafter sometimes referred to, was used in example 1, and, "PET" the above-mentioned polyethylene terephthalate resin.

4. Production Process of a Bacterial Film

In addition, after the addition of 1.1 parts by weight of master batch (made by Toray Co., Ltd., Lumirror) with respect to 100 parts by weight, were obtained under conditions of 270° C. melting temperature, to melt extruder polyethylene terephthalate resin melting the resin composition antibacterial. The unstretched film was obtained by extruding from the die.

Then, the unstretched film was preheated at 60° C., and the preheated film was stretched between the high speed roller and the low speed roller, and also stretched in the transverse direction while heating at infrared heater, the antimicrobial film was as a biaxially oriented film which thickness of 25 μm was obtained.

5. Evaluations (1) Hydrolysis Resistance and Processability
(1)-1 Master Batch Evaluation
(a) IV Value Evaluation IV (intrinsic viscosity) value of the master batch was evaluated. That is, using a viscosity tube, the IV value of the master batch was measured under the conditions of phenol/tetrachloroethane solvent (weight ratio=6/4), at 25° C., and was evaluated in accordance with the following criteria. The obtained results are shown in the table 1.

Point 6: IV value is greater than or equal to 0.8.
Point 5: IV value is the value of within 0.7 to below of 0.8.
Point 4: IV value is the value of within 0.6 to below of 0.7.
Point 3: IV value is the value of within 0.5 to below of 0.6.
Point 2: IV value is the value of within 0.4 to below of 0.5.
Point 1: IV value is the value of below of 0.4.

(b) Evaluation of Filter Clogging

Clogging of the filter was evaluated during the production of a master batch. That is, when manufacturing a master batch, the time until the cause of the clogging at the stainless steel filter for filtration and heating (wire mesh woven of 400-mesh) in the two axis extruder was measured and evaluated in accordance with the following criteria. The obtained results are shown in table 1.

Good: For 12 Hrs or more, the clogging does not cause.
Fair: From 4 Hrs to below 12 Hrs, the clogging does not cause.
Bad: Less than 4 Hrs, the clogging causes.

(1)—2 Antibacterial Resin Composition Evaluation
(a) IV Value Evaluation

The IV value of the obtained antibacterial resin composition (film and antimicrobial antibacterial fiber) was evaluated.

That is, using a viscosity tube, the IV value of the antibacterial resin composition was measured under the conditions of phenol/tetrachloroethane solvent (weight ratio=6/4), at 25° C. and was evaluated in accordance with the following criteria. The results are shown in table 1.

Point 4: IV value is 0.6 or more.
Point 3: IV value is the value of within 0.5 to below of 0.6.
Point 2: IV value is the value of within 0.4 to below of 0.5.
Point 1: IV value is a value of below of 0.4.

(b) Evaluation of Fiber Cut and Film Cut

As for the obtained resin composition resin (antimicrobial fiber and antibacterial film), the frequency of occurrence of the molding troubles based on the fiber cut and film cut were evaluated.

That is, when the fiber molding and film molding are carried out during the production of antimicrobial film and antimicrobial fiber, the time until the cause of the production troubles such as fiber cut and film cut was measured and evaluated in accordance with the following criteria. The obtained results are shown in table 1.

Good: For 12 Hrs or more, the fiber cut and film cut were not observed.
Fair: For 4 Hrs to below of 12 Hrs, the fiber cut and film cut were not observed.
Bad: Within below of 4 Hrs, the fiber cut or film cut were observed.

(2) Antimicrobial Effect Evaluation

The antimicrobial effect for the obtained antimicrobial fiber was evaluated in accordance with JIS L 1902. That is, a knitting fabric specimen (50 mm×50 mm) made from the obtained antimicrobial fiber was sterilized in an autoclave. Then, 0.4 ml of liquid inoculation of bacteria (*Staphylococcus aureus*) NBRC-12732 which was adjusted by 1/20 nutrient to be approximately $1 \times 10^5$ CFU/ml, was injected against *Staphylococcus aureus* test knitted goods after sterilization, and was maintained at 37° C. for 24 Hrs.

In addition, as a control, the number of bacteria when using the standard cloth knitted fabric instead of the specimen which was made from the antibacterial fiber, was also measured.

Next, the number of bacteria after the test (number of colony growth) and the number of bacteria prior to inoculation of bacterial suspension (the number of colony growth) were measured for test samples which was made from the antibacterial fiber and the control and evaluated in accordance with the following criteria.

Here, the number of funguses (growth colony) before test was $2.2 \times 10^4$ (CFU/test sample).

Very Good: the number of funguses after test being less than 1/10000 of the number of funguses before test Good: the number of funguses after test being equal to or more than 1/10000 to less than 1/1000 of the number of funguses before test Fair: the number of funguses after test being equal to or more than 1/1000 to less than 1/100 of the number of funguses before test Bad: the number of funguses after tests being equal to or more than 1/100 of the number of funguses before test Also, as for an antibacterial film, in accordance with the film adhesion method of JIS Z 2801, similar tests were performed to that of antibacterial fiber.

Namely, *Staphylococcus aurous* and *Escherichia coli* are used as a bacterial suspension (*Escherichia coli*), similar tests were carried out.

Then, test results and antibacterial fiber in the above-mentioned antibacterial, antimicrobial test results of the antibacterial in the film, how representative were the number of bacteria after the test (the number of village development) for the number of bacteria after the test of control as shown in table 1.

Examples 2 to 4

In examples 2 to 4, the master batch and the antibacterial fibers were manufactured and evaluated in the same manner as example 1 except that the additional content of the master batch was 3.3 pbw, 11 pbw, and 22 pbw, respectively to 100 pbw of the polyethylene terephthalate resin in the manufacturing process of the antibacterial fiber. The obtained results are shown in table 1.

Examples 5 and 6

In examples 5 and 6, the master batch and the antibacterial fibers were manufactured and evaluated in the same manner as example 2 except that the additional content of the master batch was 6.7 pbw and 33.3 pbw respectively to 100 pbw of the polyethylene terephthalate resin in the manufacturing process of the antibacterial fiber. The obtained results are shown in table 1.

Examples 7 and 8

In examples 7 and 8, the master batch and the antibacterial fibers were manufactured and evaluated in the same manner as example 2 except that a number average molecular weight of the polybutylene terephthalate resin was set to be the value of 20,000 and 40,000 respectively in the manufacturing process of the master batch. The obtained results are shown in table 1.

In the following description, the polybutylene terephthalate resin used in examples 7 and 8 would be referred to as "PBT-b" and "PBT-c" respectively.

Examples 9 to 11

In examples 9 to 11, the master batch and the antibacterial fibers were manufactured and evaluated in the same manner as example 2 except that the water content of the antibacterial glass was set to be the value of 0.001 wt. %, 0.01 wt. %, and 0.1 wt. %, respectively in the manufacturing process of the master batch. The obtained results are shown in Table 1.

Example 12

In example 12, the master batch and the antibacterial fibers were manufactured and evaluated in the same manner as example 2 except that the following borosilicate glass was used as the antibacterial glass in the manufacturing process of the master batch. The obtained results are shown in table 1.

That is, when the total amount of antibacterial glass is 100 wt. %, 49.11 wt. % of $SiO_2$, 0.76 wt. % of $Al_2O_3$, 8.98 wt. % of $K_2O$, 37.90 wt. % of $B_2O_3$, 2.99 wt. % of $Ag_2O$ and 0.26 wt. % of $CoO$ are respectively prepared as the glass raw materials and the antibacterial glass was manufactured in the same manner as example 2.

In the following description, the antibacterial glass in example 12 was referred to as "GL-B".

Examples 13 and 14

In examples 13 and 14, the master batch and the antibacterial fibers were manufactured and evaluated in the same manner as example 2 except that the volume average particle diameter of the antibacterial glass (D50) was set to be the value of 0.5 μm and 3 μm respectively, in the manufacturing process of the master batch. The obtained results are shown in table 1.

In the following description, the antibacterial glass in examples 13 and 14 were referred to as "GL-C" and "GL-D" respectively.

Comparative Example 1

In comparative example 1, the master batch and the antibacterial fibers were manufactured and evaluated in the same manner as example 2 except that the polyethylene terephthalate resin was used instead of the polybutylene terephthalate resin in the manufacturing process of the master batch. The obtained results are shown in table 1.

Comparative examples 2 to 4

In comparative examples 2 to 4, the master batch and the antibacterial fiber were manufactured and evaluated in the same manner as example 2 except that the additional content of the master batch was set to be the value of 0.11 pbw, 44 pbw, and 66 pbw respectively to 100 pbw of the polyethylene terephthalate resin in the manufacturing process of the antibacterial fiber. The obtained results are shown in table 1.

Comparative Examples 5 and 6

In comparative examples 5 and 6, the master batch and the antibacterial fiber were manufactured and evaluated in the same manner as example 2 except that the additional content of the antibacterial glass was set to be the value of 1.6 pbw and 500 pbw to 100 pbw of the polybutylene terephthalate resin in the manufacturing process of the antibacterial fiber. The obtained results are shown in table 1.

Comparative Example 7

In comparative example 7, the master batch and the antibacterial fiber were manufactured and evaluated in the same manner as example 2 except that the polybutylene terephthalate resin was used instead of the polyethylene terephthalate resin in the manufacturing process of the antibacterial fiber. The obtained results are shown in table 1.

TABLE 1

| | Antibacterial resin composite | | | | | | | | | | | | Evaluation | | | | | |
|---|---|---|---|---|---|---|---|---|---|---|---|---|---|---|---|---|---|---|
| | Master batch | | | | Antibacterial glass | | | Main resin component | | | | Hydrolysis resistance & Processability of Master batch | | | Hydrolysis resistance & Processability of Antibacterial resin composite | | | Antibacterial properties of Antibacterial resin composite |
| | Resin component | | | | Volume average | | | Numeric average | | | | IV Value | | Blocking | IV Value | | Fiber tear/ | |
| | Kind | Numeric average molecular weight (—) | Melting point (°C.) | Content (pbw) | Kind | particle diameter (μm) | Moisture Content (Wt. %) | Content (pbw) | Kind | molecular weight (—) | Melting point (°C.) | Content (pbw) | Result (—) | Evaluation | of filter | Result (—) | Evaluation | Film tear | Antibacterial |
| Example 1 | PBT-a | 30,000 | 230 | 1 | GL-A | 1 | 0.0005 | 0.1 | PET | 40,000 | 250 | 100 | 0.82 | 6 | ○ | 0.60 | 4 | ○ | ○ |
| Example 2 | PBT-a | 30,000 | 230 | 3 | GL-A | 1 | 0.0005 | 0.3 | PET | 40,000 | 250 | 100 | 0.82 | 6 | ○ | 0.61 | 4 | ○ | ◎ |
| Example 3 | PBT-a | 30,000 | 230 | 10 | GL-A | 1 | 0.0005 | 1 | PET | 40,000 | 250 | 100 | 0.82 | 6 | ○ | 0.62 | 4 | ○ | ◎ |
| Example 4 | PBT-a | 30,000 | 230 | 20 | GL-A | 1 | 0.0005 | 2 | PET | 40,000 | 250 | 100 | 0.82 | 6 | ○ | 0.64 | 4 | ○ | ◎ |
| Example 5 | PBT-a | 30,000 | 230 | 3 | GL-A | 1 | 0.0005 | 0.2 | PET | 40,000 | 250 | 100 | 0.83 | 6 | ○ | 0.64 | 4 | ○ | ○ |
| Example 6 | PBT-a | 30,000 | 230 | 3 | GL-A | 1 | 0.0005 | 1 | PET | 40,000 | 250 | 100 | 0.81 | 6 | ○ | 0.61 | 4 | ○ | ◎ |
| Example 7 | PBT-b | 20,000 | 220 | 3 | GL-A | 1 | 0.0005 | 0.3 | PET | 40,000 | 250 | 100 | 0.82 | 6 | △ | 0.60 | 4 | △ | ◎ |
| Example 8 | PBT-c | 40,000 | 250 | 3 | GL-A | 1 | 0.0005 | 0.3 | PET | 40,000 | 250 | 100 | 0.83 | 6 | ○ | 0.61 | 4 | ○ | ◎ |
| Example 9 | PBT-a | 30,000 | 230 | 3 | GL-A | 1 | 0.001 | 0.3 | PET | 40,000 | 250 | 100 | 0.83 | 6 | ○ | 0.61 | 4 | ○ | ◎ |
| Example 10 | PBT-a | 30,000 | 230 | 3 | GL-A | 1 | 0.01 | 0.3 | PET | 40,000 | 250 | 100 | 0.82 | 6 | ○ | 0.59 | 3 | ○ | ◎ |
| Example 11 | PBT-a | 30,000 | 230 | 3 | GL-A | 1 | 0.1 | 0.3 | PET | 40,000 | 250 | 100 | 0.79 | 5 | ○ | 0.58 | 3 | ○ | ◎ |
| Example 12 | PBT-a | 30,000 | 230 | 3 | GL-B | 1 | 0.0005 | 0.3 | PET | 40,000 | 250 | 100 | 0.81 | 6 | ○ | 0.56 | 3 | ○ | ◎ |
| Example 13 | PBT-a | 30,000 | 230 | 3 | GL-C | 0.5 | 0.0005 | 0.3 | PET | 40,000 | 250 | 100 | 0.81 | 6 | ○ | 0.59 | 3 | ○ | ◎ |
| Example 14 | PBT-a | 30,000 | 230 | 3 | GL-D | 3 | 0.0005 | 0.3 | PET | 40,000 | 250 | 100 | 0.83 | 6 | △ | 0.58 | 3 | △ | ◎ |
| Comparative Example 1 | PET | 40,000 | 250 | 3 | GL-A | 1 | 0.0005 | 0.3 | PET | 40,000 | 250 | 100 | 0.38 | 1 | × | 0.38 | 1 | × | ◎ |
| Comparative Example 2 | PBT-a | 30,000 | 230 | 0.1 | GL-A | 1 | 0.0005 | 0.01 | PET | 40,000 | 250 | 100 | 0.82 | 6 | ○ | 0.60 | 4 | ○ | × |
| Comparative Example 3 | PBT-a | 30,000 | 230 | 40 | GL-A | 1 | 0.0005 | 4 | PET | 40,000 | 250 | 100 | 0.82 | 6 | ○ | 0.64 | 4 | × | ◎ |
| Comparative Example 4 | PBT-a | 30,000 | 230 | 60 | GL-A | 1 | 0.0005 | 6 | PET | 40,000 | 250 | 100 | 0.84 | 6 | ○ | 0.67 | 4 | × | ◎ |
| Comparative Example 5 | PBT-a | 30,000 | 230 | 3 | GL-A | 1 | 0.0005 | 0.05 | PET | 40,000 | 250 | 100 | 0.82 | 6 | ○ | 0.61 | 4 | ○ | △ |
| Comparative Example 6 | PBT-a | 30,000 | 230 | 3 | GL-A | 1 | 0.0005 | 15 | PET | 40,000 | 250 | 100 | 0.45 | 2 | × | 0.40 | 2 | × | ◎ |
| Comparative Example 7 | PBT-a | 30,000 | 230 | 3 | GL-A | 1 | 0.0005 | 0.3 | PBT-a | 40,000 | 230 | 100 | 0.82 | 6 | ○ | 0.82 | 4 | × | ◎ |

INDUSTRIAL APPLICABILITY

According to the antibacterial resin composition or the like will be derived from the master batch of the present invention, by blending in a predetermined ratio, and the polyethylene terephthalate resin, polybutylene terephthalate resin, and an antibacterial glass, it became possible to effectively suppress the hydrolysis of polyethylene terephthalate resin as a main component.

As a result, even while the main component and polyethylene terephthalate resin film that can be processed also antibacterial and antibacterial fiber having a hydrolysis resistance, antibacterial resin composition excellent in dispersibility of the glass and thus antibacterial now you can get.

Accordingly, the present invention, the article is molded by using antibacterial antibacterial resin composition, in particular, to the high quality of film and antibacterial fiber, the present invention is expected to contributes to the various use significantly.

DESCRIPTION OF THE SIGN

1: Planetary mill, 2: a container pulverization, 3: crushed article, 5: axis revolution, 6: axis of rotation, 100 vertical mill, 106: Sarah rotation, 113: duct, 118: air introducing tube, 127: crushed room, 132: rotating disc, 136: stirring blade, 140: grinding media

The invention claimed is:

1. A method of manufacturing an antibacterial resin composition comprising a polyethylene terephthalate resin as component (A), and a polybutylene terephthalate resin as component (B), and an antibacterial glass which elutes silver ions as a component (C), which is characterized by including the following first step (a) and the second step (b):
   (a) 5 to 40 pbw (parts by weight) of the antibacterial glass as a component (C) is added to 100 pbw of the polybutylene terephthalate resin as a component (B), mixed and dispersed to obtain a master batch as the first step, and
   (b) 0.5 to 25 pbw of the master batch is added to 100 pbw of the polyethylene terephthalate resin as a component (A), mixed and dispersed to obtain the antibacterial resin composition derived from a master batch comprising below as the second step:
   (A) a polyethylene terephthalate resin: 100 pbw
   (B) a polybutylene terephthalate resin: 0.5-25 pbw
   (C) an antibacterial glass: 0.1 to 10 pbw,
   wherein the number average molecular weight of the polyethylene terephthalate resin as the component (A) is set to be a value within the range of 10,000 to 80,000, and the number average molecular weight of the polybutylene terephthalate resin as the component (B) is set to be a value in the range of 10,000 to 50,000.

2. The method of manufacturing the antibacterial resin composition according to claim 1, wherein a moisture content of the antibacterial glass is set to be a value within the range of $1 \times 10^{-4}$ to 5 wt. % with respect to the 100 wt. % of solid component of the antibacterial glass, even if the antibacterial glass as a component (C) contains the moisture.

3. The method of manufacturing the antibacterial resin composition according to claim 1, wherein the volume average particle size of the antibacterial glass as a component (C) is set to be a value within the range of 0.1 to 10 µm.

4. The method of manufacturing the antibacterial resin composition according to claim 1, wherein the antibacterial glass as a component (C), is both a phosphate antibacterial glass and a borosilicate antibacterial glass or either.

5. The method of manufacturing the antibacterial resin composition according to claim 1, wherein an alkylene fatty acid amide compound as a component (D) which is a dispersant is included, and its content is set to be a value within the range of 1 to 20 pbw to the 100 pbw of the antibacterial glass.

6. An antibacterial fiber processed from the antibacterial resin composition which is obtained from the method of manufacturing the antibacterial resin composition according to claim 1.

7. An antibacterial film processed from the antibacterial resin composition which is obtained from the method of manufacturing the antibacterial resin composition according to claim 1.

8. The method of manufacturing the antibacterial resin composition according to claim 1, wherein the number average molecular weight of the polyethylene terephthalate resin as the component (A) is set to be a value within the range of 30,000 to 50,000, and the number average molecular weight of the polybutylene terephthalate resin as the component (B) is set to be a value within the range of 25,000 to 40,000.

9. The method of manufacturing the antibacterial resin composition according to claim 1, wherein the polyethylene terephthalate resin has a melting point within the range of 150° C. to 350° C., and the polybutylene terephthalate resin has a melting point of 120° C. to 320° C.

10. The method of manufacturing the antibacterial resin composition according to claim 1, wherein a content of the polyethylene terephthalate resin is set to be within the range of 80 to 99.4 wt. % with respect to 100 wt. % of the total weight of the antibacterial resin composition.

* * * * *